United States Patent
Honma

(10) Patent No.: US 10,455,124 B2
(45) Date of Patent: Oct. 22, 2019

(54) IMAGE FORMING APPARATUS, IMAGE FORMING SYSTEM, MANAGEMENT APPARATUS, AND NON-TRANSITORY COMPUTER-READABLE RECORDING MEDIUM THAT STORES PROGRAM

(71) Applicant: KONICA MINOLTA, INC., Chiyoda-ku, Tokyo (JP)

(72) Inventor: Mikimasa Honma, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 40 days.

(21) Appl. No.: 15/787,110

(22) Filed: Oct. 18, 2017

(65) Prior Publication Data

US 2018/0131840 A1 May 10, 2018

(30) Foreign Application Priority Data

Nov. 9, 2016 (JP) ................ 2016-219129

(51) Int. Cl.
*H04N 1/60* (2006.01)
*G03G 15/00* (2006.01)

(52) U.S. Cl.
CPC ....... *H04N 1/6041* (2013.01); *G03G 15/5062* (2013.01); *G03G 15/5083* (2013.01);
(Continued)

(58) Field of Classification Search
CPC ........... G03G 15/5062; G03G 15/5083; G03G 2215/00113; H04N 1/6033; H04N 1/6041; H04N 1/6058
(Continued)

(56) References Cited

U.S. PATENT DOCUMENTS 6,061,144 A * 5/2000 Mamizuka ......... H04N 1/40006
358/1.9
8,171,503 B2 5/2012 Toru
(Continued)

FOREIGN PATENT DOCUMENTS

CN 101207675 A 6/2008
JP 2005238854 A 9/2005
(Continued)

OTHER PUBLICATIONS

Chinese Office Action dated Feb. 22, 2019 (and English translation thereof) issued in counterpart Chinese Application No. 201711089509.8.

*Primary Examiner* — Negussie Worku
(74) *Attorney, Agent, or Firm* — Holtz, Holtz & Volek PC

(57) ABSTRACT

An image forming apparatus used for an image forming system that outputs a job in a plurality of image forming apparatuses in a distributed manner, the image forming apparatus including: a communication unit that communicates with other image forming apparatuses; and a control unit that controls the communication and a distributed output of the job and includes state information on the plurality of the image forming apparatuses. The control unit determines, according to the states of each of the image forming apparatuses, the image forming apparatus for printing of a reference test chart on a transfer medium, the test chart being used as a reference for an image formation adjustment in each of the image forming apparatuses.

19 Claims, 13 Drawing Sheets

(52) U.S. Cl.
CPC ......... *H04N 1/6033* (2013.01); *H04N 1/6058* (2013.01); *G03G 2215/00113* (2013.01)

(58) Field of Classification Search
USPC ..... 358/1.15, 406; 399/17, 16, 223, 27, 301, 399/359, 49, 51
See application file for complete search history.

(56) References Cited

U.S. PATENT DOCUMENTS

| | | | | |
|---|---|---|---|---|
| 2006/0159480 | A1* | 7/2006 | Mima | B41J 3/60 399/82 |
| 2007/0024657 | A1* | 2/2007 | Zhang | H04N 1/6033 347/19 |
| 2008/0155568 | A1 | 6/2008 | Toru | |
| 2011/0262186 | A1* | 10/2011 | Takuwa | G03G 15/0126 399/223 |
| 2013/0250322 | A1* | 9/2013 | Kawabata | H04N 1/60 358/1.9 |
| 2014/0043632 | A1* | 2/2014 | Uchida | G06F 3/1297 358/1.13 |
| 2014/0043634 | A1* | 2/2014 | Haga | H04N 1/00904 358/1.13 |
| 2014/0139869 | A1* | 5/2014 | Honma | H04N 1/00347 358/1.15 |
| 2015/0271347 | A1* | 9/2015 | Honma | H04N 1/00862 358/1.13 |
| 2016/0112581 | A1* | 4/2016 | Kishi | H04N 1/6033 358/504 |
| 2017/0075260 | A1* | 3/2017 | Honma | G03G 15/161 |
| 2019/0122351 | A1* | 4/2019 | Honma | G06T 7/001 |

FOREIGN PATENT DOCUMENTS

| | | |
|---|---|---|
| JP | 2006343599 A | 12/2006 |
| JP | 2013214269 A | 10/2013 |

* cited by examiner

FIG.9

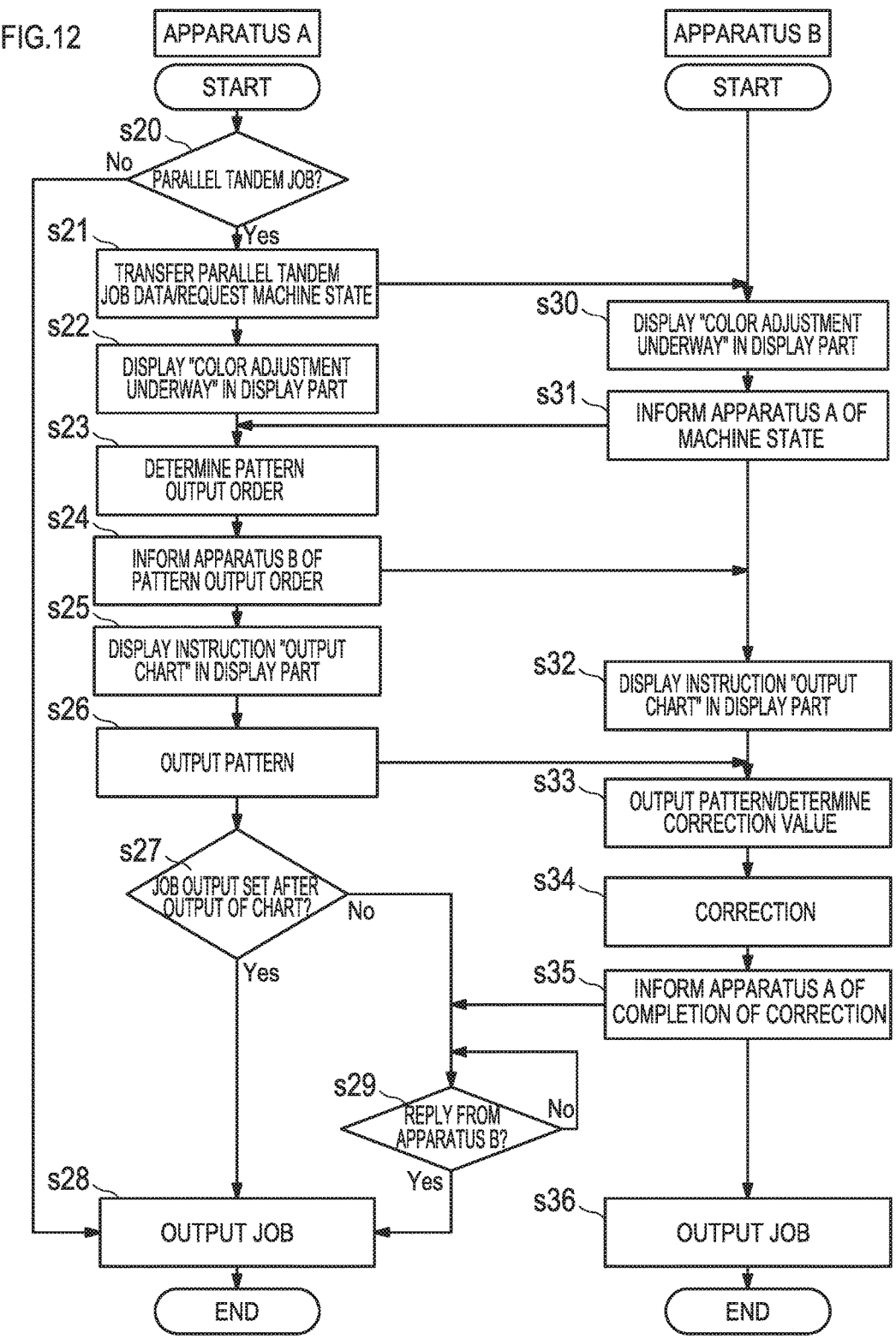

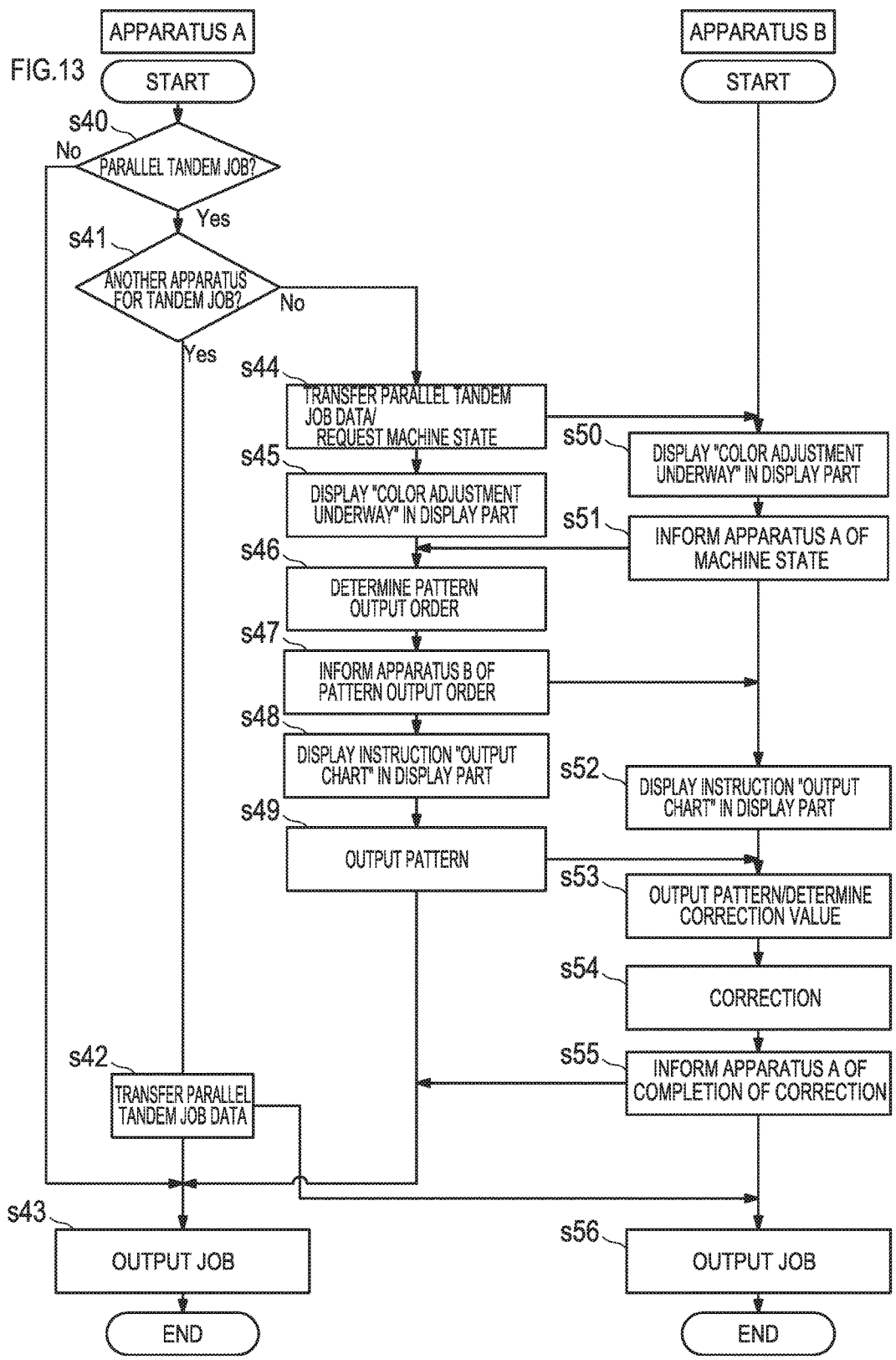

IMAGE FORMING APPARATUS, IMAGE FORMING SYSTEM, MANAGEMENT APPARATUS, AND NON-TRANSITORY COMPUTER-READABLE RECORDING MEDIUM THAT STORES PROGRAM

Japanese patent application No. 2016-219129 filed on Nov. 9, 2016 including description, claims, drawings, and abstract the entire disclosure is incorporated herein by reference in its entirety

BACKGROUND

Technological Field

The present invention relates to an image forming apparatus, an image forming system, a management apparatus, and a non-transitory computer-readable recording medium that stores a program that can output a job in a plurality of image forming apparatuses in a distributed manner.

Description of the Related Art

At present, there has been a need for high-speed printing, for example, when a large volume of printed matters are to be printed. For example, there is a system enabling distributed printing, in which a plurality of image forming apparatuses on a network are used to distribute a job to simultaneously output printed matters (Hereinafter, will be called parallel tandem).

For example, a job of 500 copies can be evenly divided to 250 copies each between an image forming apparatus A and an image forming apparatus B, or 300 copies can be assigned to the image forming apparatus A and 200 copies can be assigned to the image forming apparatus B according to the output speeds of the devices, thereby saving time. Alternatively, the pages of a copy can be output by multiple image forming apparatuses in a distributed manner.

Generally, in image forming apparatuses, stabilization control is performed to adjust color matching and concentrations in a proper range. For example, in Japanese Patent Laid-Open No. 2006-343599, a test chart is output in an image forming apparatus where color matching is needed, information on the image forming apparatus is selected, and then the chromaticity of the test chart is accurately detected by an image forming apparatus including a color sensor. After that, correction information is output to reduce an image color difference between the devices according to the chromaticity result of the test chart, and then an image is output using the correction information in the image forming apparatus where color matching is needed. However, the devices in Japanese Patent Laid-Open No. 2006-343599 are not devised in consideration of parallel tandem.

In a tandem system, stabilization control is performed in every image forming apparatus when a main image forming apparatus satisfies certain conditions (including a specified number of prints, an extended period of standby, and the first startup in the morning). For example, Japanese Patent Laid-Open No. 2013-214269 proposes a management system that manages the color-corrected states of multiple image output devices, the management system including acquisition means that acquires, from the image output devices, information on color-corrected states under predetermined color correction conditions, and indication means that indicates the color-corrected states of the image output devices under the predetermined color correction conditions based on the acquired information on the color-corrected states.

However, the management system of Japanese Patent Laid-Open No. 2013-214269 is assumed to be a system that previously has knowledge of a color-corrected state, and the management system cannot accommodate a system in which a reference for color correction varies.

To address the problem, for example, when the image forming apparatus A is used as a reference, a test chart is output in the image forming apparatus A and the same test chart is visually inspected or a correction amount is determined by a reader in the image forming apparatus B. The correction amount is a difference determined between the image forming apparatus A and the image forming apparatus B. A correction can be made using the correction amount set as a correction set value of the image forming apparatus B. However, a smooth adjustment is likely to become difficult depending on the states of the apparatuses.

SUMMARY

The present invention has been devised against the backdrop of these circumstances. An object of the present invention is to properly determine an image forming apparatus that prints a reference test chart when a job is output in a distributed manner.

To achieve at least one of the abovementioned objects, according to an aspect of the present invention, an image forming apparatus reflecting one aspect of the present invention is an image forming apparatus used for an image forming system that outputs a job in a plurality of image forming apparatuses in a distributed manner, the image forming apparatus including:

a communication unit that communicates with other image forming apparatuses; and a control unit that controls the communication and a distributed output of the job and includes state information on the plurality of the image forming apparatuses, wherein the control unit determines, according to states of each of the image forming apparatuses, the image forming apparatus for printing of a reference test chart on a transfer medium, the test chart being used as a reference for an image formation adjustment in each of the image forming apparatuses.

To achieve at least one of the abovementioned objects, according to an aspect of the present invention, an image forming system reflecting one aspect of the present invention is an image forming system including a plurality of image forming apparatuses, the image forming system outputting a job in the plurality of the image forming apparatuses in a distributed manner, the system including:

a control unit that controls a distributed output of the job and includes state information on the plurality of the image forming apparatuses; and a communication unit that provides communications between the control unit and the plurality of the image forming apparatuses and is controlled by the control unit, wherein the control unit determines, according to states of each of the image forming apparatuses, the image forming apparatus for printing of a reference test chart on a transfer medium, the test chart being used as a reference for an image formation adjustment in each of the image forming apparatuses.

To achieve at least one of the abovementioned objects, according to an aspect of the present invention, a management apparatus reflecting one aspect of the present invention is a management apparatus that manages a system including a plurality of image forming apparatuses, the system outputting a job in the plurality of the image forming apparatuses in a distributed manner, the management apparatus including:

a communication section that provides communications between the management apparatus and the image forming apparatuses; and a management control section that controls a distributed output of the job and includes state information on the plurality of the image forming apparatuses, wherein the management control section determines, according to states of each of the image forming apparatuses, the image forming apparatus for printing of a reference test chart on a transfer medium, the test chart being used as a reference for an image quality adjustment in each of the image forming apparatuses.

To achieve at least one of the abovementioned objects, according to an aspect of the present invention, a non-transitory computer-readable recording medium that stores a program reflecting one aspect of the present invention is a non-transitory computer-readable recording medium that stores a program executed in a computer for controlling a distributed output of an image forming system including a plurality of image forming apparatuses, the image forming system outputting a job in the plurality of the image forming apparatuses in a distributed manner, the program causing the computer to perform:

communications with the plurality of the image forming apparatuses;

control of distributing the job and causing a group of the plurality of the image forming apparatuses to form images; and determination of the image forming apparatus for printing of a reference test chart on a transfer medium, according to states of each of the image forming apparatuses, the test chart being used as a reference for an image quality adjustment in each of the image forming apparatuses.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein;

FIG. 9 shows a screen indicating that a job is being output;

FIG. 12 is a flowchart showing the steps of determining, in a distributed output, the order of the image forming apparatuses for adjusting image quality, and outputting a job based on the setting of a job output after the output of a pattern; and FIG. 13 is a flowchart showing the step of outputting a job when a distributed output is continued in the absence of another destination apparatus for distribution.

DETAILED DESCRIPTION OF EMBODIMENTS

Hereinafter, one or more embodiments of the present invention will be described with reference to the drawings. However, the scope of the invention is not limited to the disclosed embodiments.

An image forming apparatus and an image forming system according to an embodiment of the present invention will be described below in accordance with the accompanying drawings.

Figure 1:
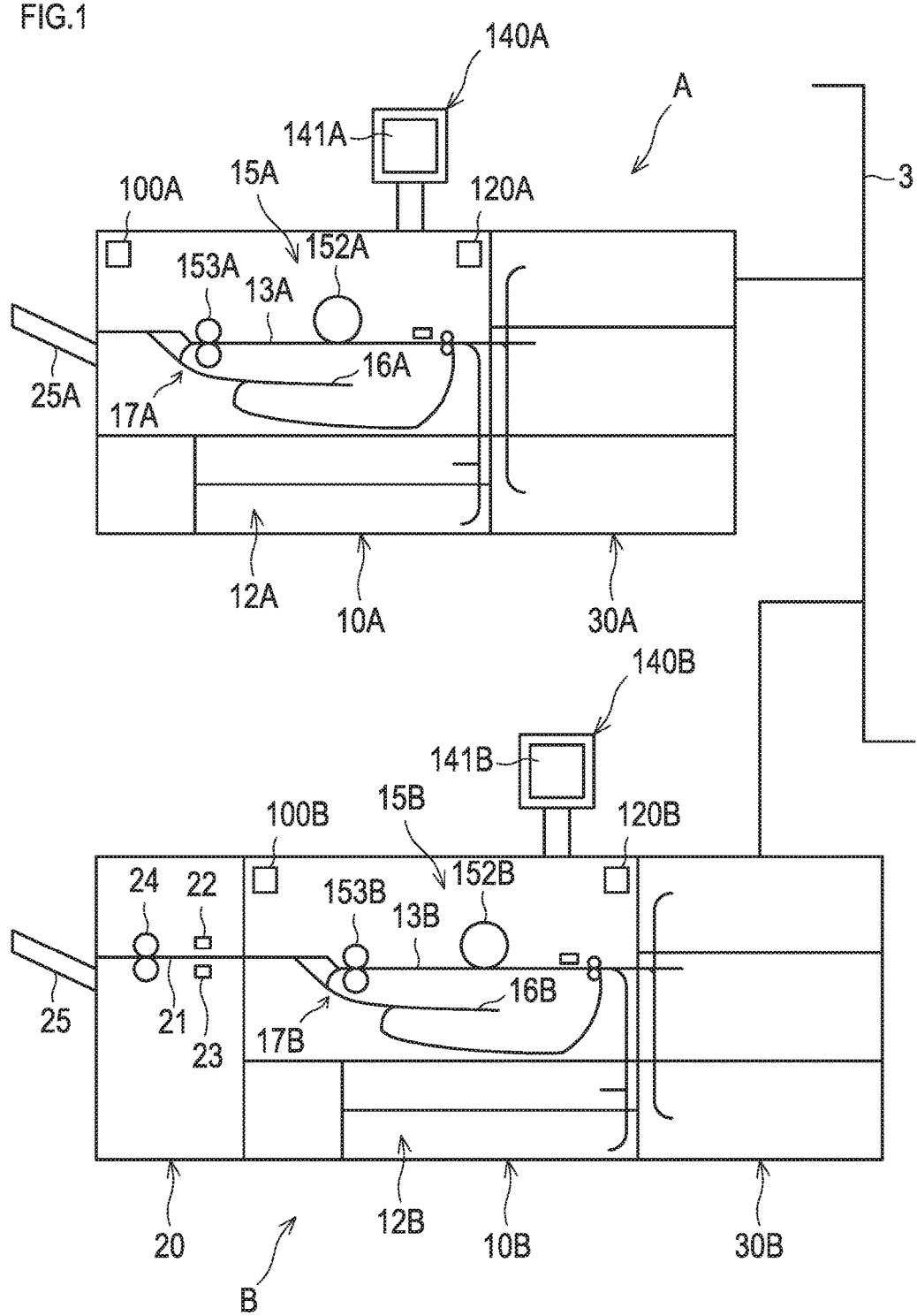
FIG. 1 is a schematic diagram showing image forming apparatuses and an image forming system according to an embodiment of the present invention.

An image forming system 1 includes image forming apparatuses (image forming apparatuses A and B in the drawings). The image forming apparatuses are electrically connected to one another via a network 3, e.g., a LAN or Ethernet (trademark). In FIG. 1, the image forming apparatuses is connected via a bus, but can be connected in a ring or a star. The pattern of connection according to the present invention is not particularly limited. Moreover, the number of image forming apparatuses constituting the image forming system is not particularly limited.

In the image forming apparatuses, the presence or absence of postprocessing devices, the kind of postprocessing, and the number of postprocessing devices are not particularly limited. Thus, the device configuration is not particularly limited. Image forming devices of different models can be provided or some or all of the image forming apparatuses can be provided as the same model. Image quality may vary among the devices of the same model.

The image forming apparatus A includes an image-forming apparatus body 10A. A feeder 30A on the upstream side in a paper feeding direction is connected to the image-forming apparatus body 10A. Transfer paper can be fed from the feeder 30A into the image-forming apparatus body 10A. In the present embodiment, the image-forming apparatus body 10A and the feeder 30A constitute the image forming apparatus A. The image forming apparatus A may only include the image-forming apparatus body 10A, or the image-forming apparatus body 10A and the feeder 30A may constitute the system. Devices connected to the image forming apparatus are not particularly limited.

The image-forming apparatus body 10A further includes a feed tray 12A that holds sheets of transfer paper in the lower part of the body. The transfer paper can be fed from the feeder 30A or the feed tray 12A. The transfer paper corresponds to a transfer medium. The transfer medium can be an OHP medium or a fabric as well as paper.

The image-forming apparatus body 10A includes an image forming unit 15A that forms an image on a sheet of transfer paper. The image forming unit 15A includes photoconductors 152A prepared for respective colors (cyan, magenta, yellow, black, etc.). Moreover, electrifiers (not shown), writing units each of which includes an LD 151A, and developing units are respectively disposed on the peripheries of the photoconductors 152A for the respective colors. On the surface of the photoconductor 152A electrically charged by the electrifier, the writing unit performs image exposure based on image information about documents recorded in image memory or the like, forming a latent image on the surface of the photoconductor 152A. The latent image is developed into a toner image by the developing unit. The toner image is transferred onto an intermediate transfer belt. At the time of image formation, a sheet of transfer paper is fed from the feeder 30A or the feed tray 12A and is transported along a transport path 13A. An image on the intermediate transfer belt is transferred by a secondary transfer roller onto the sheet of transfer paper transported along the transport path 13A.

The sheet of transfer paper with the transferred image is fused by a fuser 153A and then is transported along the transport path 13A. The image forming apparatus of the present invention can be a monochrome model or a special color (clear) can be used in addition to the above-mentioned colors.

On the downstream side of the fuser 153A on the transport path 13A, an inverting transport path 17A branches where the sheet of image-bearing transfer paper is inverted and circulated to the upstream side of the image forming unit 15A. The inverting transport path 17A has an inverting unit 16A that inverts a sheet of transfer paper fed to the inverting transport path 17A and circulates the sheet to the transport path 13A upstream of the image forming unit 15A, thereby forming the image on the back side of the sheet.

A sheet of transfer paper with an image formed on one side or a sheet of transfer paper with images formed on both sides is ejected through the transport path 13A onto a paper output tray 25A.

The image-forming apparatus body 10A further contains an image control unit 100A that controls the overall image forming apparatus A. The image control unit 100A includes a CPU, programs executed by the CPU, parameters, and a storage part serving as a work area. The programs can be distributed through a mobile storage medium. When the image control unit 100A performs control upon outputting a job in a distributed manner, the image control unit 100A corresponds to the control unit of the present invention. In this case, the control unit indicates, as a computer, the image forming apparatuses to output the job in a distributed manner. The programs executed by the control unit correspond to the programs of the present invention. The storage unit that stores the programs corresponds to a non-transitory computer-readable recording medium that stores programs according to the present invention.

Furthermore, the device configurations and operating states of the image forming apparatuses can be obtained to determine which one of the image forming apparatuses is to be used for printing a reference test chart of an image quality adjustment. The image-forming apparatus body 10A further includes a communication unit 120A that communicates with other image forming apparatuses through the network 3.

The image forming apparatus B will be discussed below.

The image forming apparatus B includes an image-forming apparatus body 10B. A feeder 30B on the upstream side in a feeding direction is connected to the image-forming apparatus body 10B. Transfer paper can be fed from the feeder 30B into the image-forming apparatus body 10B. In the present embodiment, the image-forming apparatus body 10B and the feeder 30B constitute the image forming apparatus B. The image forming apparatus B may only include the image-forming apparatus body 10B, or the image-forming apparatus body 10B and the feeder 30B may constitute the system. Devices connected to the image forming apparatus are not particularly limited.

The image-forming apparatus body 10B further includes a feed tray 12B that holds sheets of transfer paper in the lower part of the body. The transfer paper can be fed from the feeder 30B or the feed tray 12B. The transfer paper corresponds to a transfer medium. The transfer medium can be an OHP medium or a fabric as well as paper.

The image-forming apparatus body 10B includes an image forming unit 15B that forms an image on a sheet of transfer paper. The image forming unit 15B includes photoconductors 152B prepared for respective colors (cyan, magenta, yellow, black, etc.). Moreover, electrifiers (not shown), writing units each of which includes an LD 151B, and developing units are respectively disposed on the peripheries of the photoconductors 152B for the respective colors. On the surface of the photoconductor 152B electrically charged by the electrifier, the writing unit performs image exposure based on image information about documents recorded in image memory or the like, forming a latent image on the surface of the photoconductor 152B. The latent image is developed into a toner image by the developing unit. The toner image is transferred onto an intermediate transfer belt. At the time of image formation, a sheet of transfer paper is fed from the feeder 30B or the feed tray 12B and is transported along a transport path 13B. An image on the intermediate transfer belt is transferred by a secondary transfer roller onto the sheet of transfer paper transported along the transport path 13B.

The sheet of transfer paper with the transferred image is fused by a fuser 153B and then is transported along the transport path 13B. The image forming apparatus of the present invention can be a monochrome model or a special color (clear) can be used in addition to the above-mentioned colors.

On the downstream side of the fuser 153B on the transport path 13B, an inverting transport path 17B branches where the sheet of image-bearing transfer paper is inverted and circulated to the upstream side of the image forming unit 15A. The inverting transport path 17B has an inverting unit 16B that inverts a sheet of transfer paper fed to the inverting transport path 17B and circulates the sheet to the transport path 13B upstream of the image forming unit 15A, thereby forming the image on the back side of the sheet.

The image-forming apparatus body 10B further contains an image control unit 100B that controls the overall image forming apparatus B. The image control unit 100B includes a CPU, programs executed by the CPU, parameters, and a storage part serving as a work area. The programs can be distributed through a mobile storage medium. When the image control unit 100B perform control upon outputting a job in a distributed manner, the image control unit 100B corresponds to the control unit of the present invention. In this case, the control unit indicates the image forming apparatuses to output a job in a distributed manner. Furthermore, the device configurations and operating states of the image forming apparatuses can be obtained to determine which one of the image forming apparatuses is to be used for printing a reference test chart of an image quality adjustment. In this case, the control unit indicates, as a computer, the image forming apparatuses to output a job in a distributed manner. The programs executed by the control unit correspond to the programs of the present invention. The storage unit that stores the programs corresponds to a non-transitory computer-readable recording medium that stores programs according to the present invention. The image-forming apparatus body 10B further includes a communication unit 120B that communicates with other image forming apparatuses through the network 3.

An image reader 20 is connected to the downstream side of the image-forming apparatus body 10B in the paper feeding direction. In the present embodiment, the image-forming apparatus body 10B, the image reader 20, and the feeder 30B constitute the image forming apparatus B. The image forming apparatus B may only include the image-forming apparatus body 10B, or the image forming apparatus B, the image reader 20, and the feeder 30B may constitute the system.

The image reader 20 includes a transport path 21 connected to the transport path 13B, an image reading unit 22 that reads an image under the image reading unit 22, the image reading unit 22 being disposed at an upstream position on the transport path 21 so as to be placed above the transport path 21, and an image reading unit 23 that reads an image above the image reading unit 23, the image reading unit 23 being disposed under the transport path 21. The reading results of the image reading units 22 and 23 are transmitted to the image control unit 100B and are used for an image quality adjustment, e.g., a color correction or a density correction in the image forming unit 15B. Transfer rollers 24 provided on the transport path 21 allow the image reading units 22 and 23 to read an image on a sheet of transfer paper.

The image reading units 22 and 23 can be image pickup devices such as a CCD and a CIS and are desirably longer than the width of a sheet of transfer paper transported along the transport path 21. The image reading unit can be a colorimeter.

In this explanation, the image forming apparatus B includes the image reader. The image reader can be provided outside the image forming apparatus so as to read an image on a sheet of transfer paper.

Figure 2:
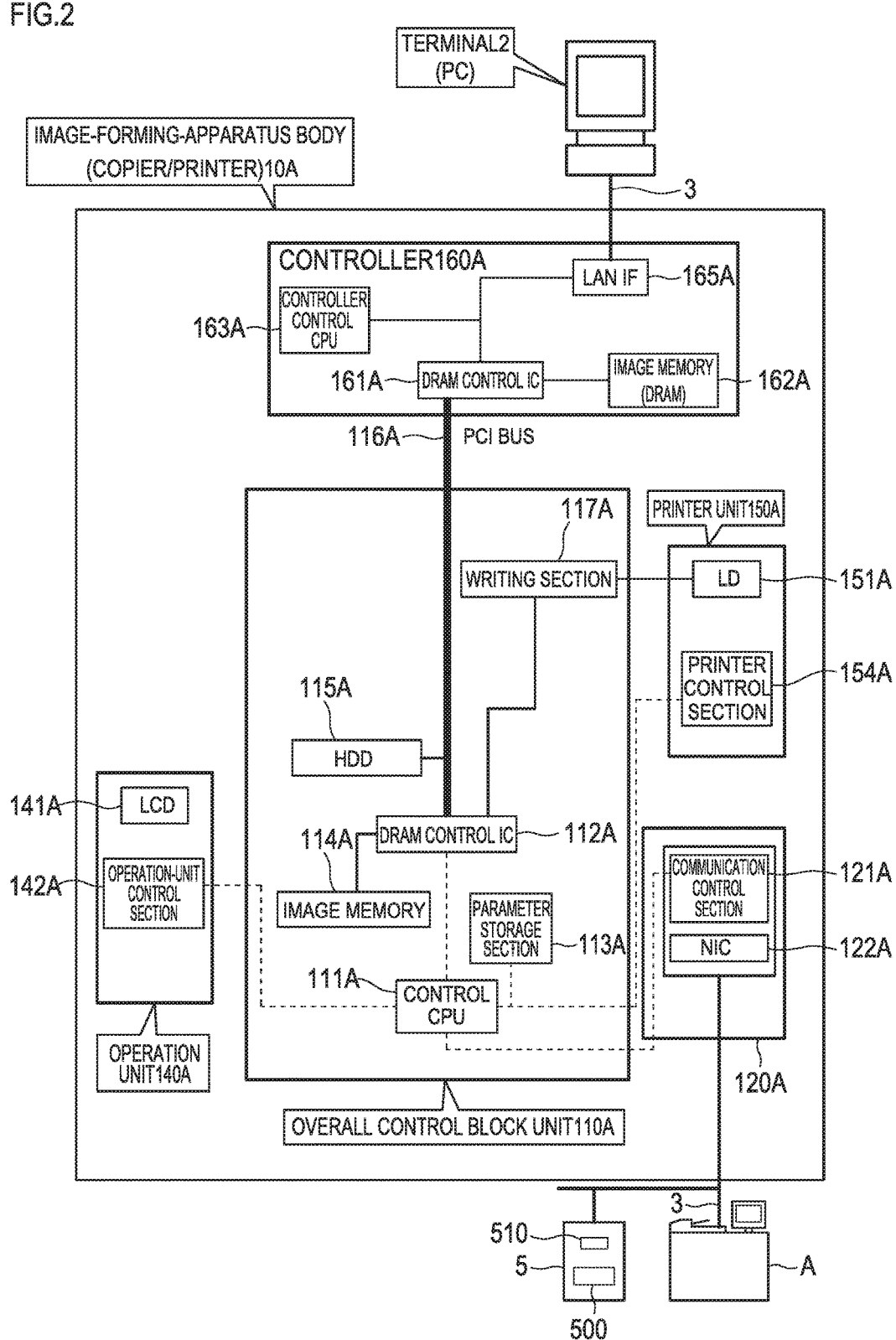
FIG. 2 is a control block diagram showing one of the image forming apparatuses.
Figure 3:
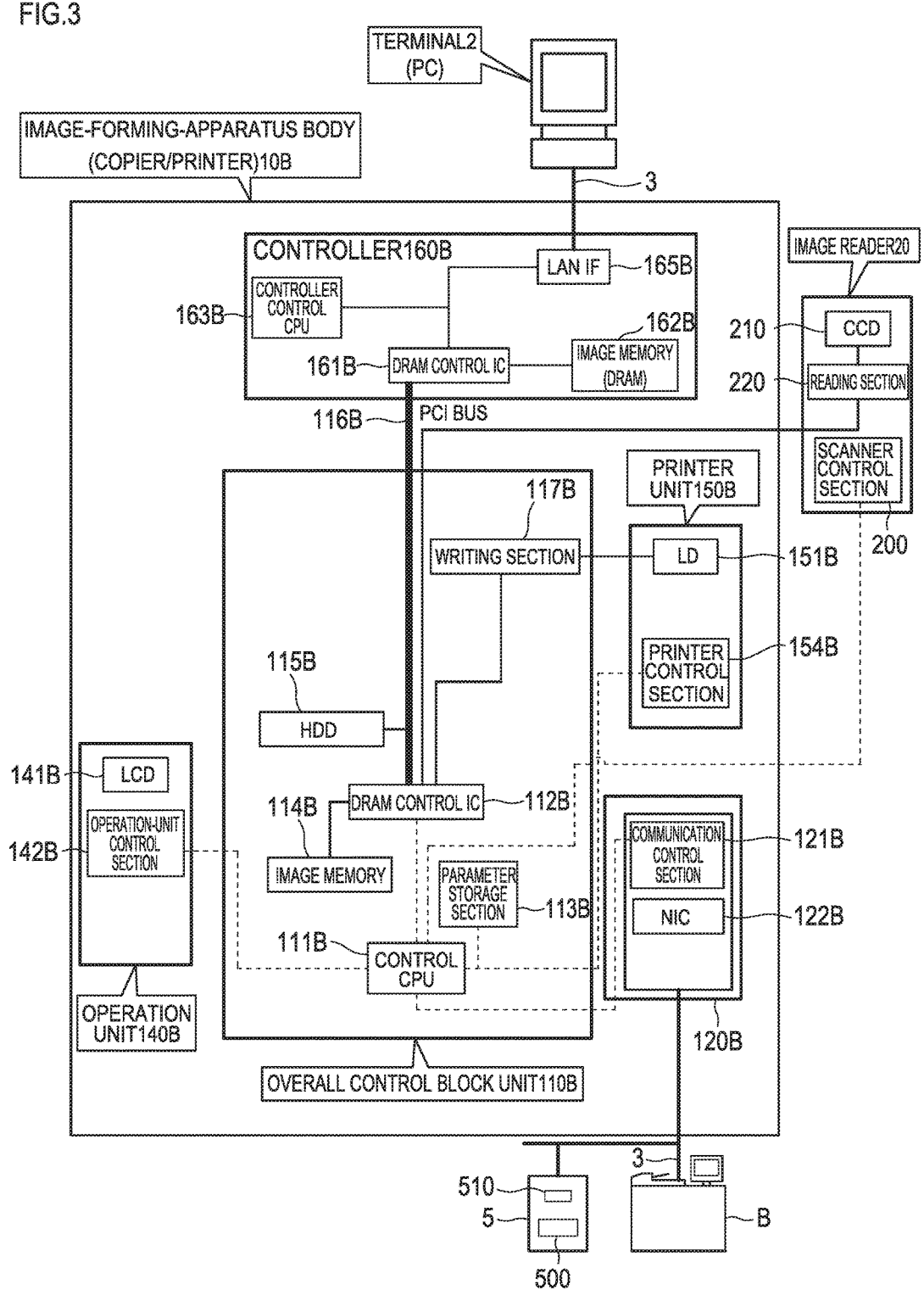
FIG. 3 is a control block diagram showing the other image forming apparatus.

FIGS. 2 and 3 are control block diagrams of the image forming system 1. In FIG. 2, the image forming apparatus A is a main constituent element.

The image forming apparatus A is mainly composed of an overall control block unit 110A, an operation unit 140A, a printer unit 150A, and a controller 160A that processes image data input and output to and from an external apparatus (e.g., a terminal 2) through the network 3.

The overall control block unit 110A includes a control CPU 111A. A DRAM control IC 112A is connected to the control CPU 111A. Moreover, a parameter storage section 113A including nonvolatile memory and an image memory 114A are connected to the control CPU 111A. The control CPU 111A, the parameter storage section 113A, the image memory 114A, and so on are included in the image control unit 100A. In the parameter storage section 113A, operation parameters and programs for operating the control CPU 111A are stored.

The control CPU 111A controls the overall image forming apparatus A, for example, image formation in the image forming unit 15A and the transportation of transfer paper on the transport path 13A and identifies the state of the overall image forming apparatus A. Moreover, the control CPU 111A controls the communication unit 120A, which will be discussed later, so as to transmit and receive data to and from external devices or image forming apparatuses through the network 3. The control CPU 111A can constitute the control unit of the present invention, that is, a computer along with programs executed by the control CPU 111A. In the case where the programs are stored in the parameter storage section 113A, the parameter storage section 113A corresponds to a non-transitory computer-readable recording medium that stores programs according to the present invention.

The overall control block unit 110A includes a PCI bus 116A that is connected to the DRAM control IC 112A and transmits and receives data to and from the controller 160A.

The operation unit 140A includes a touch-panel LCD 141A and an operation-unit control section 142A. The LCD 141A and the operation-unit control section 142A are connected to each other. The operation-unit control section 142A and the control CPU 111A are connected to each other so as to perform serial communications. With this configuration, the operation unit 140A is controlled by the control CPU 111A. The operation-unit control section 142A can be configured with a CPU and programs for operating the CPU.

The DRAM control IC 112A is connected to the image memory 114A. The image memory 114A stores, for example, image information acquired by a scanner unit or the like, image information externally acquired through the network 3, printing conditions, and file information.

In addition, an HDD 115A (hard disk) is connected to the DRAM control IC 112A via the PCI bus 116A. The HDD 115A can store data with nonvolatility. The HDD 115A can store programs, parameters, image data, and so on. In the case where the programs of the present invention are stored in the HDD 115A, the HDD 115A corresponds to a non-transitory computer-readable recording medium that stores programs.

Moreover, a writing section 117A is connected to the DRAM control IC 112A. The writing section 117A is connected to the LD 151A of the printer unit 150A and processes data used for an operation of the LD 151A. The printer unit 150A includes a printer control section 154A that controls the overall printer unit 150A. The printer control section 154A is connected to the control CPU 111A by serial connection so as to be controlled by the control CPU 111A.

In the controller 160A, an image memory (DRAM) 162A including DRAM is connected to the DRAM control IC 161A. The DRAM control IC 161A, a controller control CPU 163A that controls the overall controller 160A, and a LAN interface 165A are connected to a common bus in the controller 160A. The LAN interface 165A is connected to the network 3.

Moreover, a communication control section 121A that controls the overall communication unit 120A for external communications is connected to the control CPU 111A. The communication control section 121A can be connected to the network 3 via a NIC 122A (network interface card) included in the communication unit 120A.

The communication control section 121A operates in response to an operation command of the control CPU 111A. The communication control section 121A can transmit data including the configuration of the apparatus, image information, the number of reserved jobs, and image parameters from the control CPU 111A to the network 3 through the NIC 122A according to a predetermined communication procedure. Moreover, the communication control section 121A can receive data including the apparatus configurations of other image forming apparatuses, image information, and the number of reserved jobs, and so on from the network 3 through the NIC 122A, and transmit the data to the control CPU 111A. In other words, the image forming apparatus A can transmit state information on the apparatus to other image forming apparatuses and acquire state information on other image forming apparatuses.

Referring to FIG. 3, the control block of the image forming apparatus B will be described below.

FIG. 3 is a control block diagram of the image forming system 1. The image forming apparatus B is a main constituent element.

The image forming apparatus B is mainly composed of an overall control block unit 110B, an operation unit 140B, a printer unit 150B, and a controller 160B that processes image data input and output to and from an external apparatus (e.g., a terminal 2) through the network 3.

The overall control block unit 110B includes a control CPU 111B. A DRAM control IC 112B is connected to the control CPU 111B. Moreover, a parameter storage section 113B including nonvolatile memory and an image memory 114B are connected to the control CPU 111B. The control CPU 111B, the parameter storage section 113B, the image memory 114B, and so on are included in the image control unit 100B.

In the parameter storage section 113B, operation parameters and programs for operating the control CPU 111B are stored.

The control CPU 111B controls the overall image forming apparatus B, for example, image formation in the image forming unit 15B and the transportation of transfer paper on the transport path 13B and identifies the state of the overall image forming apparatus B. Moreover, the control CPU 111B receives the reading results of the image reading units 22 and 23. Moreover, the control CPU 111B controls the communication unit 120B, which will be discussed later, so as to transmit and receive data to and from external devices or image forming apparatuses through the network 3.

The overall control block unit 110B includes a PCI bus 116B that is connected to the DRAM control IC 112B and transmits and receives data to and from the controller 160B.

The operation unit 140B includes a touch-panel LCD 141B and an operation-unit control section 142B. The LCD 141B and the operation-unit control section 142B are connected to each other. The operation-unit control section 142B and the control CPU 111B are connected to each other so as to perform serial communications. With this configuration, the operation unit 140B is controlled by the control CPU 111B. The operation-unit control section 142B can be configured with a CPU and programs for operating the CPU.

The DRAM control IC 112B is connected to the image memory 114B. The image memory 114B stores, for example, image information acquired by a scanner unit or the like, image information externally acquired through the network 3, printing conditions, and file information.

In addition, an HDD 115B (hard disk) is connected to the DRAM control IC 112B via the PCI bus 116B. The HDD 115B can store data with nonvolatility. The HDD 115B can store programs, parameters, image data, and so on. In the case where the programs of the present invention are stored in the HDD 115B, the HDD 115B corresponds to a non-transitory computer-readable recording medium that stores programs.

Moreover, a writing section 117B is connected to the DRAM control IC 112B. The writing section 117B is connected to the LD 151B of the printer unit 150B and processes data used for an operation of the LD 151B. The printer unit 150B includes a printer control section 154B that controls the overall printer unit 150A. The printer control section 154B is connected to the control CPU 111B by serial connection and is controlled by the control CPU 111B.

In the controller 160B, an image memory (DRAM) 162B including DRAM is connected to the DRAM control IC 161B. The DRAM control IC 161B, a controller control CPU 163B that controls the overall controller 160B, and a LAN interface 165B are connected to a common bus in the controller 160B. The LAN interface 165B is connected to the network 3.

Moreover, a communication control section 121B that controls the overall communication unit 120B for external communications is connected to the control CPU 111B. The communication control section 121B can be connected to the network 3 via a NIC 122B (network interface card) included in the communication unit 120B.

The communication control section 121B operates in response to an operation command of the control CPU 111B. The communication control section 121B can transmit data including the configuration of the apparatus, image information, the number of reserved jobs, and image parameters from the control CPU 111B to the network 3 through the NIC 122B according to a predetermined communication procedure. Moreover, the communication control section 121B can receive data including the apparatus configurations of other image forming apparatuses, image information, operating states, and the number of reserved jobs from the network 3 through the NIC 122B, and transmit the data to the control CPU 111B. In other words, the image forming apparatus B can transmit state information on the apparatus to other image forming apparatuses and acquire state information on other image forming apparatuses.

A scanner control section 200 of the image reader 20 is connected to the control CPU 111B. The scanner control section 200 controls an operation of a CCD 210 included in each of the image reading units 22 and 23. The CCD is provided in each of the image reading units 22 and 23. Moreover, a reading control section 220 is connected to the CCD 210 and the DRAM control IC 112B. Data read by the CCD 210 is processed by the reading control section 220 and then is transmitted to the DRAM control IC 112B. After that, image quality parameters such as a color tone, density balance, and a line width can be calculated in the control CPU 111B, allowing an image quality adjustment of the image forming unit 15B. Image quality can be automatically adjusted according to settings such as a predetermined number of sheets and a predetermined elapsed time or a user may provide an instruction to adjust image quality through the operation unit 140B. Furthermore, when a job is output by a plurality of image forming apparatuses in a distributed manner, image quality can be evenly adjusted among the image forming apparatuses under the control of the control sections, which control the distributed jobs, and in response to instructions from the control sections.

In the examples shown in FIGS. 2 and 3, a management apparatus 5 is connected to the network 3. In the present invention, the management apparatus is optionally included in the image forming system.

The management apparatus 5 includes a management control section 500 that controls the overall management apparatus 5. The management apparatus 5 further includes an NIC 510 that is connected to, for example, the managed image forming apparatuses A and B through the network 3.

The management control section 500 includes a CPU and programs for operating the CPU. Moreover, the management control section 500 includes a storage section having ROM, RAM, or nonvolatile memory.

In the case where the role of the management control section 500 is to manage the image forming apparatuses connected to the network, the management control section 500 can control the operations of the image forming apparatuses and acquire the machine configurations and operating states (including the number of reserved jobs) of the image forming apparatuses. At the printing of a distributed job, the management control section 500 can select the image forming apparatus capable of outputting the job in response to a request for distributed printing, and then provide an instruction to print the job in a distributed manner for the selected image forming apparatus.

In the case of an image quality adjustment, the image forming apparatus for printing a reference test chart is determined according to the apparatus configurations and operating states (including the number of reserved jobs) of the image forming apparatuses. After that, image information of the test chart is transmitted to the image forming apparatuses. When the reference test chart and an individual test chart are printed on the same sheet of transfer paper, area information on the charts on the sheet can be transmitted to the image forming apparatuses. In addition, in the following explanation, a distributed job is controlled by the control sections, but the functions of the control sections may be performed in the management control section 500 of the management apparatus 5. In this case, programs executed in the management control section 500 can be stored in a storage section (not shown) installed in, for example, the management control section 500. The storage section that stores the programs corresponds to the non-transitory computer-readable recording medium that stores programs in the present invention.

The basic operations of the image forming apparatuses A and B will be described below.

First, the steps of accumulating image information in the image forming apparatuses A and B will be described below.

In the case where a document image is read by the scanner unit to generate image information in the image forming apparatuses A and B, the scanner unit is controlled from the control CPUs 111A and 111B. The image data read by the CCD of the scanner unit is processed and then the processed image information is stored in the image memories 114A and 114B and the HDDs 115A and 115B through the DRAM control ICs 112A and 112B. The image information and printing information that are in the image memories 114A and 114B and the HDDs 115A and 115B are managed as jobs by the control CPUs 111A and 111B. If the information is managed by the management apparatus 5, the information can be stored in the management apparatus 5.

In the case where image information and printing information are acquired from the outside, for example, job information and image information that are transmitted from the terminal 2 or the like through the network 3 are stored in the image memories 162A and 162B through the LAN interfaces 165A and 165B by the DRAM control ICs 161A and 161B.

Data in the image memories 162A and 162B is stored in the image memories 114A and 114B through the DRAM control ICs 161A and 161B, the PCI buses 116A and 116B, and the DRAM control ICs 111A and 111B. In the case where printing data is page description data, the CPUs 163A and 163B can perform RIP processing on the printing data to generate a raster image.

The image information and the printing information can be acquired from the management apparatus 5 and other image forming apparatuses through the NICs 122A and 122B. The job information is stored in the image memories 114A and 114B and the HDDs 115A and 115B through the DRAM control ICs 112A and 112B.

In the reception of a distributed job, the job can be received through the NICs 122A and 122B. Likewise, image information for test charts can be received through the NICs 122A and 122B. The image information and the printing information are processed by the control CPUs 111A and 111B.

The job information is managed by the control CPUs 111A and 111B. In the job management, printing conditions are set and are stored in the image memories 114A and 114B and the HDDs 115A and 115B in association with the image information.

The printing conditions include information on a print mode, transfer paper information, a feed tray, a destination of paper delivery, and postprocessing conditions. Specifically, the printing conditions include the number of pixels of an output image, a color or monochrome image, single-sided/double-sided printing, a color tone adjustment, a sheet size, a paper orientation, the type of transfer paper (e.g., a sheet type, a basis weight, and a paper color), feed tray selection, an image formation position, the presence or absence of postprocessing, and postprocessing conditions.

The printing conditions are set by a user through the operation units 140A and 140B or are automatically set by the control sections according to initial settings or operating states.

In the case where an image is output by the image forming apparatuses A and B, that is, the image forming apparatuses A and B serve as copiers or printers, in the use of printing data stored in the image memories 114A and 114B, image information is transmitted to the writing sections 117A and 117B through the DRAM control ICs 112A and 112B and is written in the photoconductors 152A and 152B by the LDs 151A and 151B according to the printing information associated with the image information.

In the printer units 150A and 150B, the sections are controlled by the printer control sections 154A and 154B having received commands from the control CPUs 111A and 111B. The printer units 150A and 150B include image forming units 15A and 15B, paper feed mechanisms, and transport mechanisms.

The printer units 150A and 150B refer to the printing conditions and perform control based on the contents of the printing conditions. In the image forming units 15A and 15B, toner images written to the photoconductors 152A and 152B are transferred to the intermediate transfer belts, are transferred to sheets of transfer paper fed through the feed trays 12A and 12B, and then are fixed by the fusers 153A and 153B. The transfer paper is ejected downstream by the transport paths 13A and 13B. In double-sided printing on transfer paper, sheets of transfer paper having passed through the fusers 153A and 153B are delivered to the inverting transport paths 17A and 17B so as to be inverted by the inverting units 16A and 16B, and then are returned to the transport paths 13A and 13B to form images on the back sides of the sheets.

In an image quality adjustment, an image patch is formed on a sheet of transfer paper and is read by each of the image reading units 22 and 23, allowing an adjustment. Images can be periodically corrected every predetermined number of sheets or predetermined time and can be corrected under the control of the control CPUs 111A and 111B in response to user instructions through the operation units 140A and 140B or commands from external apparatuses.

In the case of distributed printing in the image forming apparatuses A and B, if distributed jobs are managed by the image forming apparatus for controlling distributed jobs, specifically, the image forming apparatus A, the control CPU 111A distributes a job and determines parts of the job to be allocated to each of the image forming apparatuses. The image forming apparatus A outputs the job as needed, as well as instructs other image forming apparatuses of distributed printing, and transmits image information. The jobs can be distributed according to copies, or pages can be printed in a distributed manner.

The control CPU 111A having acquired the machine configurations and operating states (including the number of reserved jobs) of the image forming apparatuses determines the image forming apparatus for printing the reference test chart, according to the apparatus configurations and operating states (including the number of reserved jobs) of the image forming apparatuses in an image quality adjustment during the printing of the distributed jobs. Furthermore, in the case of printing of test-chart image information or the reference test chart and an individual test chart on the same sheet of transfer paper, area information on the charts on the sheet of transfer paper can be transmitted to the image forming apparatus.

Causing the multiple image forming apparatuses on the network to output the same job in a distributed manner will be specifically discussed below.

For example, a job of 500 copies can be evenly divided to 250 copies each between the image forming apparatuses, or 300 copies can be distributed to the image forming apparatus A and 200 copies can be distributed to the image forming apparatus B to be output according to the output speeds of the apparatuses, thereby saving time.

In this case, individual differences between the apparatuses may cause a color difference between output matters according to the contents of previously output jobs and the degree of correction. Thus, a correction for color matching between the apparatuses is desirably made before a parallel tandem job.

In a color matching method, a test chart is output in the image forming apparatus A, an output sheet is set on the tray of the image forming apparatus B, and then the same test chart is printed in a region other than a region printed by the image forming apparatus A, allowing a correction with a correction amount determined by a visual inspection or a reader.

(FIG. 1)

(For example, when the image forming apparatus A is used as a reference, a difference from the image forming apparatus B to the image forming apparatus A is determined and is set as a correction set value of the image forming apparatus B.)

Figure 4:
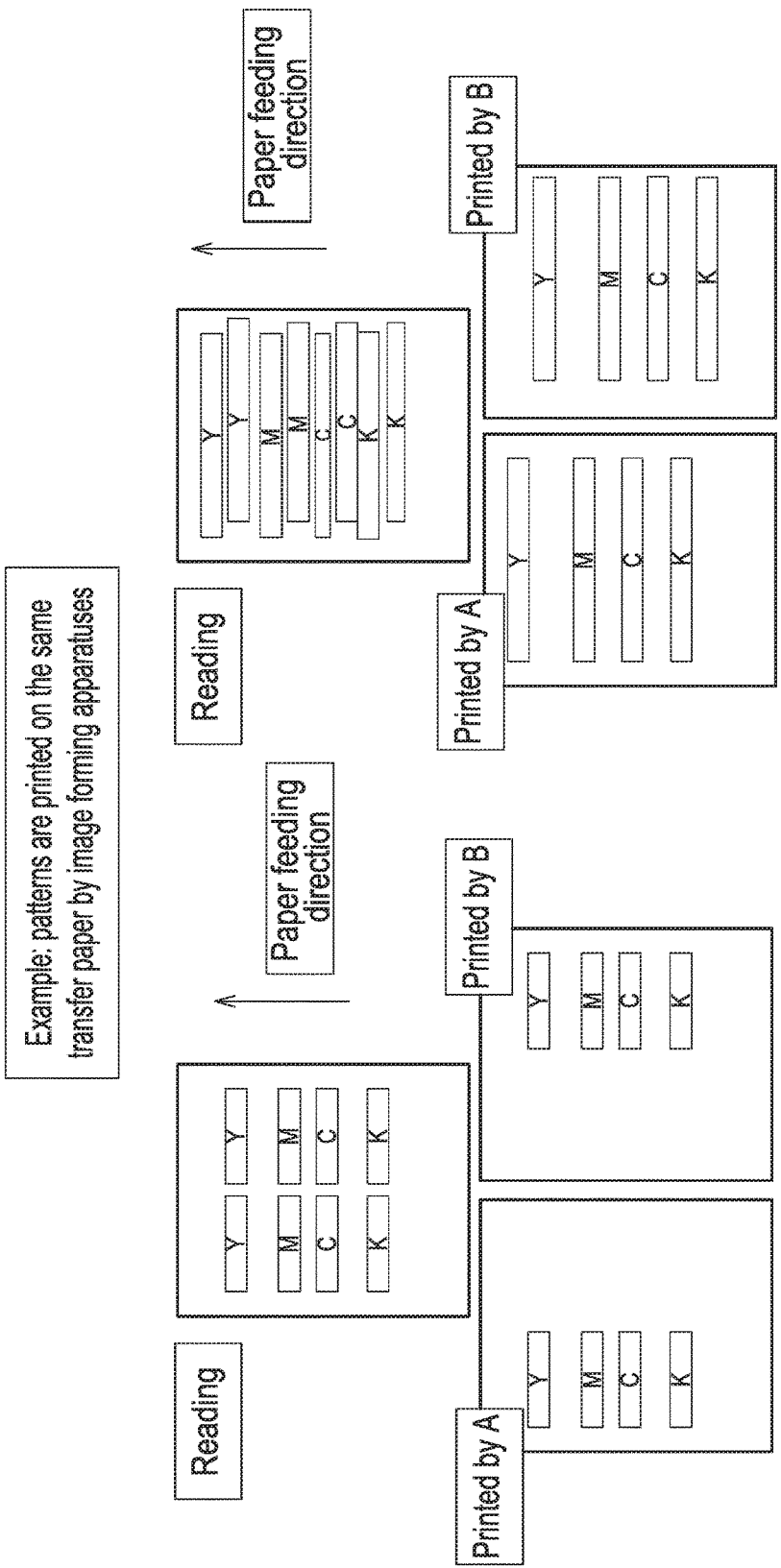
FIG. 4 shows the printing results of test charts.

FIG. 4 shows an example of the test chart.

In this configuration, the reference test chart and an individual test chart are printed on the same sheet of transfer paper. For example, the reference chart is printed in the image forming apparatus A while the individual chart is printed in the image forming apparatus B.

The left part of FIG. 4 shows that in the left half of a sheet of transfer paper, a chart of Y, M, C, and K along a main scanning direction is printed with a certain spacing in a transport direction. The sheet of transfer paper is then set on the feed tray of the image forming apparatus B. After that, in the right half of the sheet, a chart of Y, M, C, and K along the main scanning direction is printed using the same image data with a certain spacing in the transport direction. Regarding the printing regions of the charts, regions allocated to each of the image forming apparatuses can be indicated by the control sections that control distributed jobs. The sheet of transfer paper at the upper left of FIG. 4 shows a result after the chart printed in the image forming apparatus B. The reference test chart and the individual test chart are printed separately on the right and left sides. The sheet of transfer paper is read by the image reading units 22 and 23 (each of which reads a corresponding surface) of the image forming apparatus B. If it is found that image quality in the image forming apparatus B is different from that of the test chart printed in the image forming apparatus A as a result of reading, the image forming apparatus B is adjusted so as to have the same image quality as the image forming apparatus A.

In the right part of FIG. 4, a reference chart of Y, M, C, and K along the main scanning direction is printed with a certain spacing in the transport direction on a sheet of transfer paper. After that, the sheet of transfer paper is set on the feed tray of the image forming apparatus B, and then an individual chart of Y, M, C, and K is printed along the main scanning direction such that Y, M, C, and K of the charts are alternately placed in the transport direction. The reference chart and the individual chart are printed so as to be shifted from each other in the main scanning direction. The sheet of transfer paper is read by the image reading units 22 and 23 (each of which reads a corresponding surface) of the image forming apparatus B. If it is found that image quality in the image forming apparatus B is different from that of the test chart printed in the image forming apparatus A as a result of reading, the image forming apparatus B is adjusted so as to have the same image quality as the image forming apparatus A.

During the printing of an image on the same sheet of transfer paper, the reference chart and an individual chart can be arranged in any layout. The layout of the charts of the present invention is not particularly limited as long as images can be distinguished from others when being read.

However, an image quality adjustment is a time-consuming process and thus efficient color matching is required for reducing downtime. Moreover, after a parallel tandem job of the image forming apparatus A and the image forming apparatus B is decided, if a chart is output by the image forming apparatus A and then another job is output by the image forming apparatus A so as to make an aging correction during color matching in the image forming apparatus B, a color tone is changed from that at the output of a color matching chart. This causes a mismatch between the image forming apparatus A and the image forming apparatus B.

An object of the present embodiment is to efficiently perform color matching in a plurality of image forming apparatuses. In the present invention, however, an image adjustment is not limited to color matching. The present invention may be aimed at properly adjusting image quality.

At the time of color matching in the image forming apparatuses, the image forming apparatus to output a reference test chart is determined according to the states of the image forming apparatuses. Furthermore, the output order of the image forming apparatuses for printing test charts can be determined.

In some cases, an imaging apparatus includes a printer not provided with a reader, readers such as a scanner, or a reader for reading by the time of paper ejection after the output of a chart. In this case, for example, if a chart is finally output by a printer not provided with a reader, a correction value is determined by a visual check. Thus, if a chart is finally output by a printer provided with a reader, a correction value can be correctly calculated with ease from the reading result of the reader.

First Embodiment

In the printing of distributed jobs, an image forming apparatus for a distributed output needs to be selected. For example, a parallel tandem output apparatus is set by inputting a destination IP address (FIG. 5).

Figure 5:
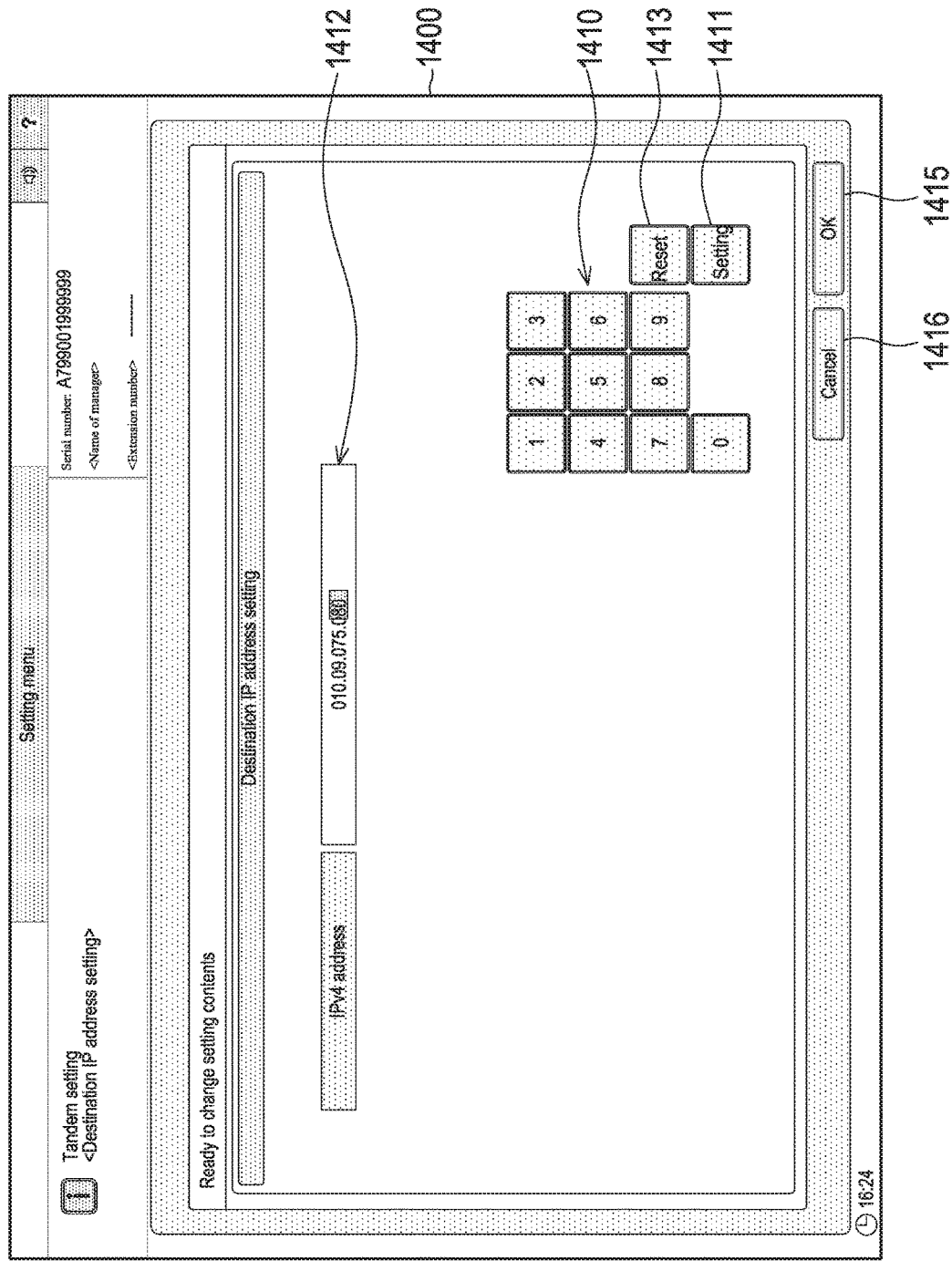
FIG. 5 shows a setting screen indicating an operation screen for specifying another apparatus for a tandem job.

FIG. 5 shows a destination IP-address setting screen 1400 on the operation unit 140A or the operation unit 140B. Also when controlling a distributed job in the management apparatus 5, the same destination IP-address setting screen can be displayed on an operation unit included in the management apparatus 5.

The destination IP-address setting screen 1400 has a ten key 1410 for entering a destination IP address of a distributed job. A setting button 1411 is pressed to allow entry. An entered number is displayed in an IP address display field 1412. The entered number is reset by pressing a reset button 1413.

The destination IP-address setting screen 1400 displays an OK button 1415 and a cancel button 1416 that are kept active at the bottom right of the screen. The entered destination IP address is established by pressing the OK button 1415. If another image forming apparatus is subsequently designated as a destination, the apparatus can be added by repeating the above process.

The display on the destination IP-address setting screen is canceled by pressing the cancel button 1416.

Figure 6:
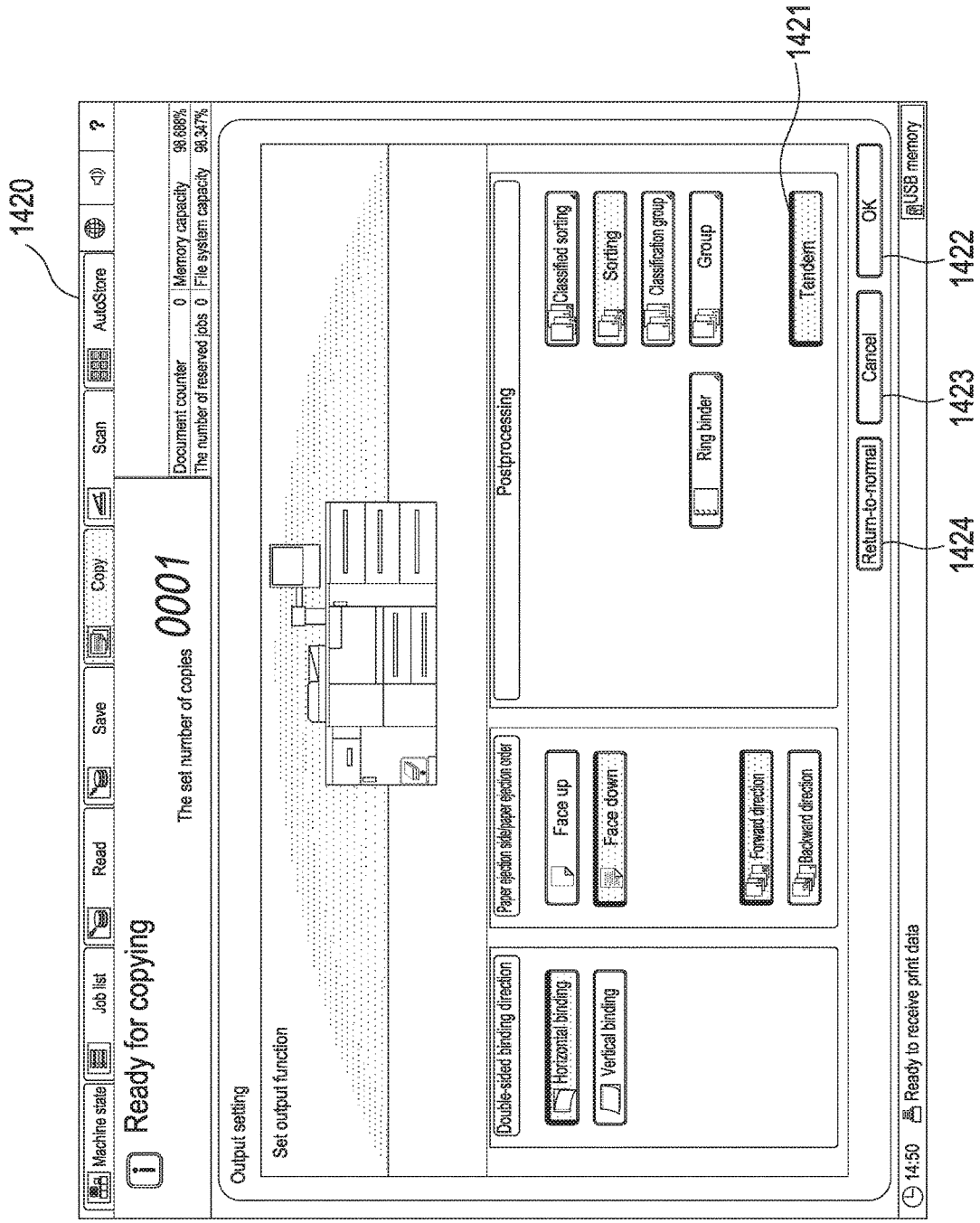
FIG. 6 shows a setting screen for setting tandem on/off.

A parallel tandem job can be switched on or off on the output setting screen of a job. FIG. 6 shows an example of the setting on an output setting screen 1420.

On the output setting screen 1420, a tandem button 1421 is displayed in an active state at the bottom right of the screen. Pressing the tandem button 1421 causes a tandem job to switch on or off. When a tandem job is switched on, the button is highlighted to indicate a state of selection. Moreover, an OK button 1422, a cancel button 1423, and a return-to-normal button 1424 are displayed in an active state under the tandem button 1421. Pressing the OK button 1422 establishes the contents of settings. Pressing the cancel button 1423 cancels the contents of settings. Pressing the return-to-normal button 1424 causes the settings to return to normal settings.

Figure 7:
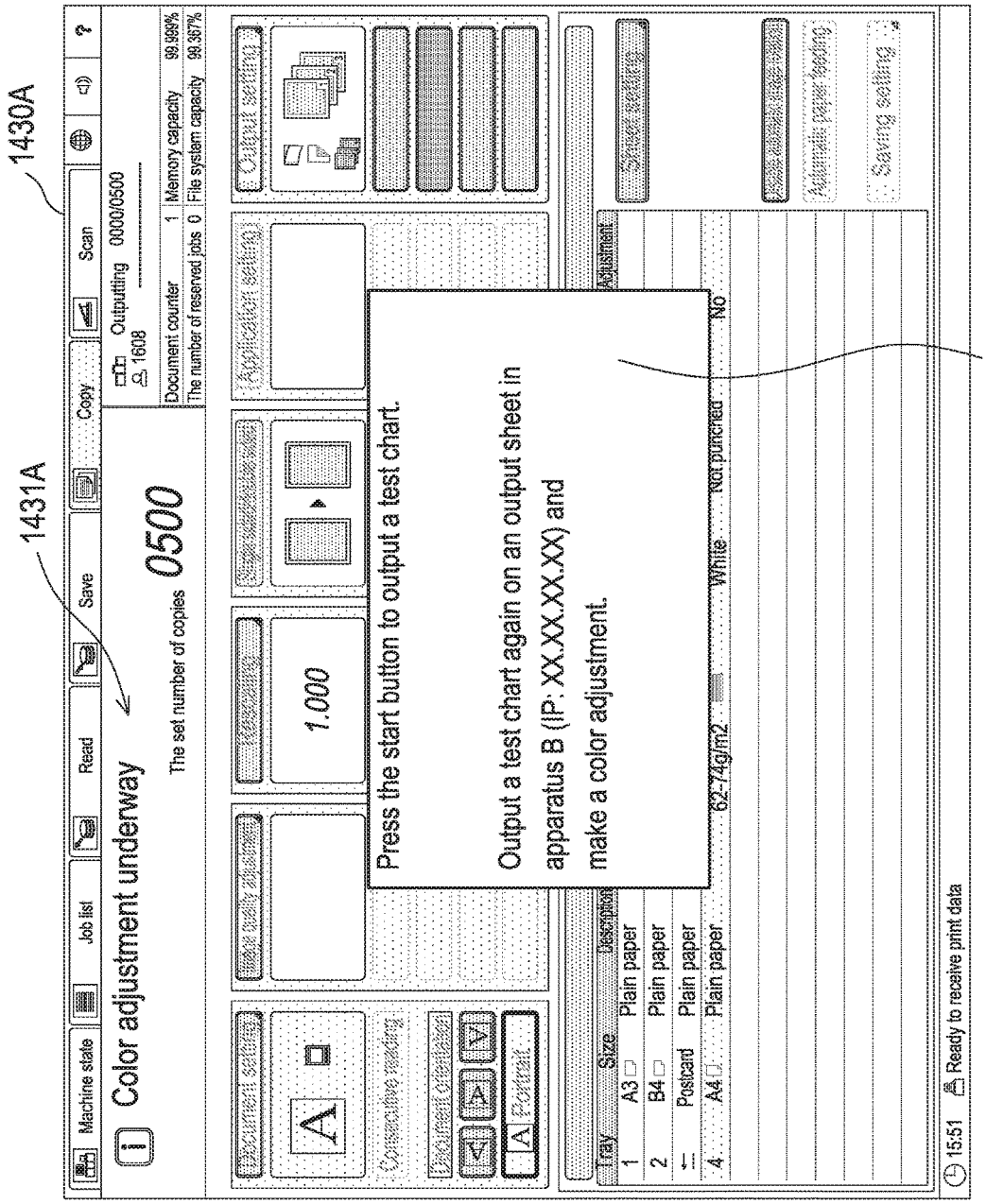
FIG. 7 shows a screen indicating that an image quality adjustment is underway in the reference image forming apparatus and a screen indicating an instruction to start the output of a test chart and the image forming apparatus that uses the test chart.

At the start of a parallel tandem job (e.g., a print or copy button is pressed from the controller), the image forming apparatus A having received the job requests a reply about a parallel tandem job reservation and a machine state from the image forming apparatus B, which serves as a tandem output destination, and then waits for a response. During that time, as shown in FIG. 7, "Color adjustment underway" is displayed in a display part 1431A on an operation screen 1430A of the image forming apparatus A. The image forming apparatus B having received the request for a parallel tandem job reservation and a machine state from the image forming apparatus A informs the image forming apparatus A of the machine state (reader installation state/reversed job state) of the image forming apparatus B while receiving data on reserved jobs.

In the case where the image forming apparatus A is a printer in the configuration diagram and the image forming apparatus B is an apparatus connected to a reader in the configuration diagram, the image forming apparatus A having received a reply about the presence of a reader from the image forming apparatus B decides that a test chart should be output later in the image forming apparatus B, since the image forming apparatus A is not connected to a reader. Then, as shown in FIG. 7, "Output a test chart and make a color adjustment in apparatus B (IP: XX.XX.XX.XX)" is displayed in a display part 1432A of the image forming apparatus A (FIG. 7), and the image forming apparatus B is instructed to output a chart.

Figure 8:
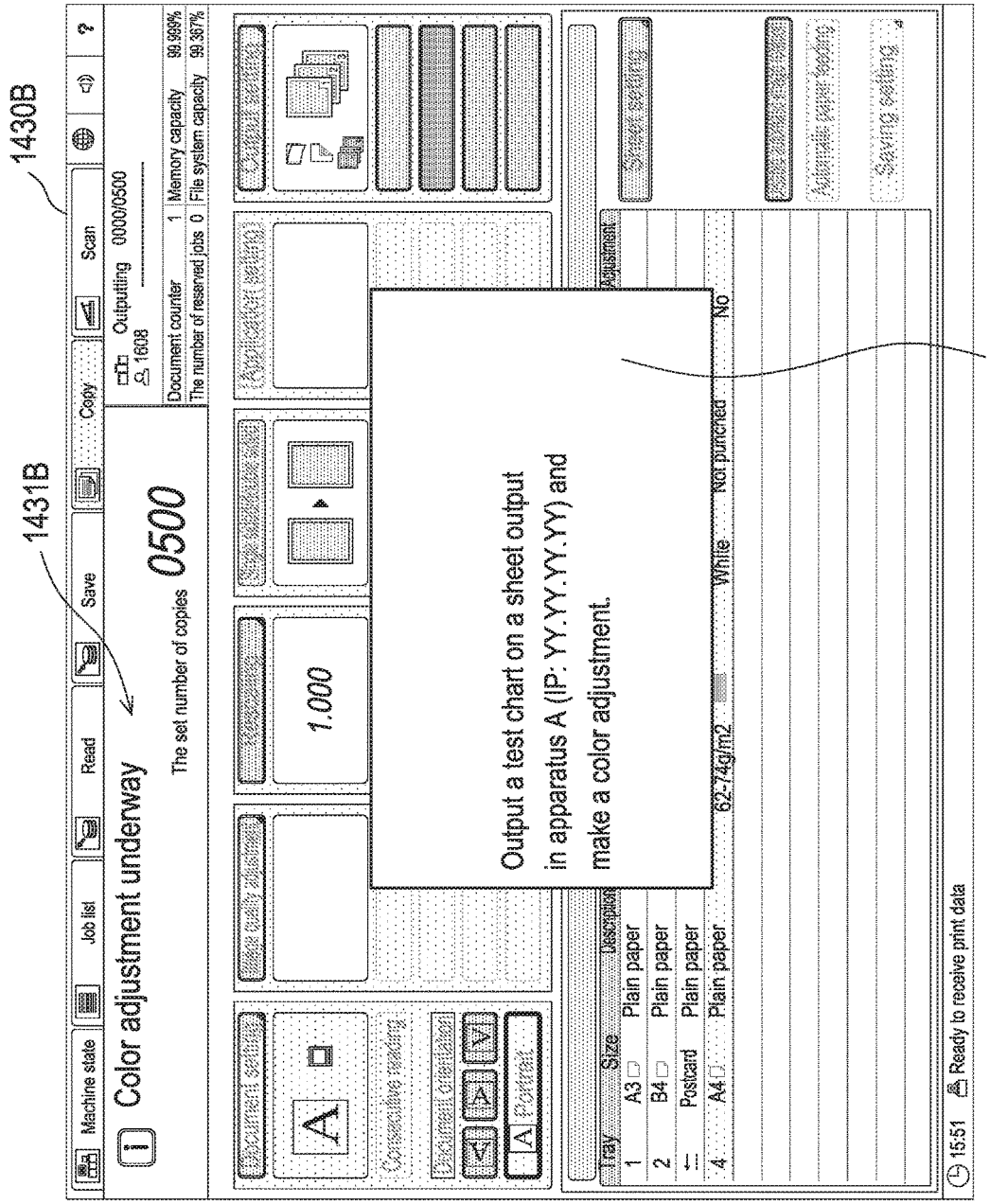
FIG. 8 shows a screen indicating that an image quality adjustment is underway in the other image forming apparatus for a tandem job and a screen indicating the image forming apparatus having output a test chart and an instruction to start a test chart.

During that time, when a parallel tandem job is output in response to a parallel tandem job reservation, the image forming apparatus B displays, as shown in FIG. 8, "Color adjustment underway" in a display part 1431B of a setting screen 1430B until a reply is received from the image forming apparatus A. When the image forming apparatus B is instructed from the image forming apparatus A to output a test chart later, the image forming apparatus B displays "Set a sheet output in apparatus A (IP: YY.YY.YY.YY) in the tray and make a color adjustment" in a display part 1432B.

A user outputs a test chart in the image forming apparatus A and then outputs a test chart in the image forming apparatus B. The image forming apparatus B calculates a correction value of the image forming apparatus B based on the reading result of the reader, which is connected to the image forming apparatus A, so as to match colors to those of the image forming apparatus A, and then informs the image forming apparatus A of the completion of adjustment. The image forming apparatus A starts the output of a parallel tandem job in response to the reply, and then the image forming apparatus B outputs a parallel tandem job after making a correction according to the correction value.

Figure 9:
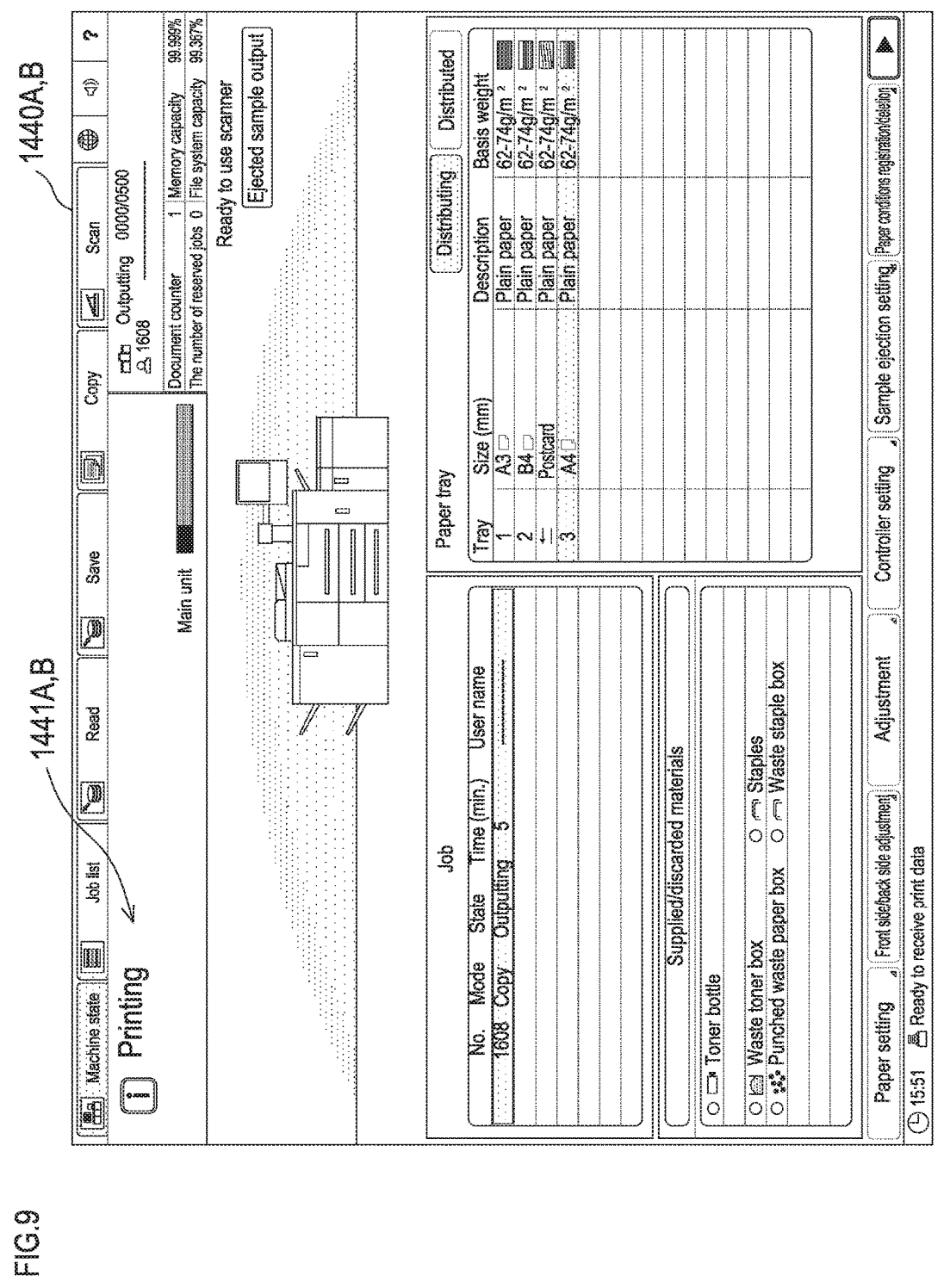

As shown in FIG. 9, during the output of a chart, the image forming apparatuses A and B only need to display "Printing" in display parts 1441A and 1441B of display screens 1440A and 1440B as in regular printing.

As described above, the order of color matching is determined according to the state of the image forming apparatus, achieving an efficient color adjustment.

Second Embodiment

In the case where a chart output by a reference image forming apparatus is set on the tray of another image forming apparatus and is output, it is preferable to initially output the chart from the image forming apparatus having a smaller number of reserved jobs before a parallel tandem job.

While a reference test chart is output by the image forming apparatus that prints the reference test chart, the other image forming apparatus (a target of color matching) may perform reserved jobs before a parallel tandem job. Thus, in response to a machine state, the image forming apparatus A having a smaller number of reserved jobs first outputs a chart according to the reserved job states of the image forming apparatus A and the image forming apparatus B, and then the image forming apparatus B is instructed to output a chart later.

Thus, from the output of a chart from the image forming apparatus A to the setting of the chart on the tray of the image forming apparatus B, the image forming apparatus B can also output reserved jobs before a parallel tandem job, achieving an efficient color adjustment.

Third Embodiment

Correction history information (a correction frequency, a correction degree) in an operation of an image forming apparatus alone is included in machine state information. A test chart is first output in a stable image forming apparatus having a smaller number of corrections, that is, a smaller range of correction. After the test chart is output, a parallel tandem job is output during an adjustment of another image forming apparatus, thereby increasing the outputs of the stable image forming apparatus.

Moreover, the image forming apparatus having made a color adjustment disables a color correction corresponding to the number of output sheets/aged deterioration. This prevents a color correction only in one of the image forming apparatuses, thereby precluding an increase in color difference between the image forming apparatuses in parallel tandem.

Figure 10:
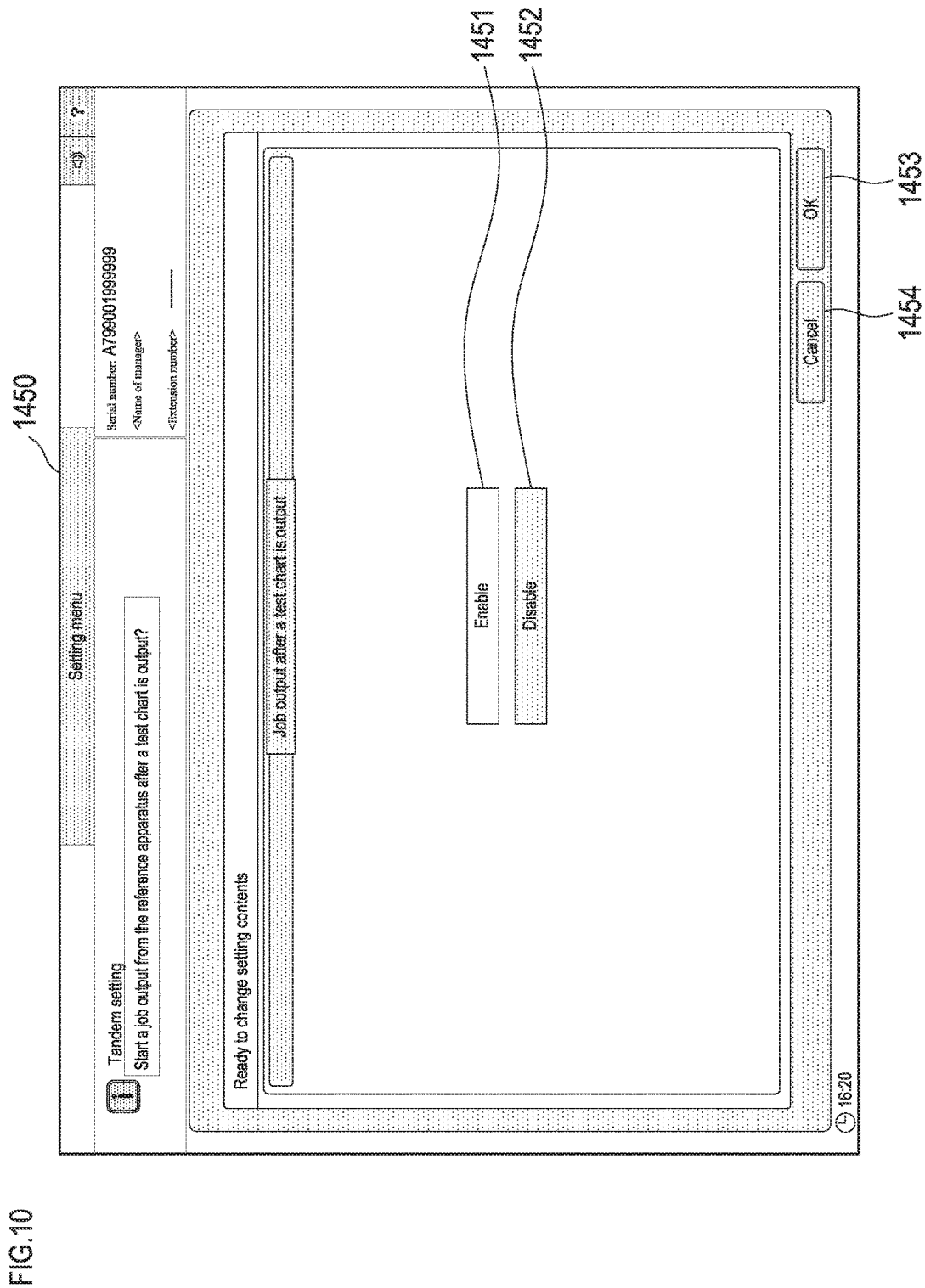
FIG. 10 shows a screen for setting a job output after a reference test chart is output.

Alternatively, after a test chart is output, the reference image forming apparatus can start an output during an adjustment of the other image forming apparatus. Since a color adjustment may be performed (repeated) several times, whether to start the output of a parallel tandem job is determined by a user setting, for example, during an adjustment of the other image forming apparatus. In FIG. 10, whether to start the output of a job can be set after a test chart is output on a setting screen 1450 of the image forming apparatus. The setting screen 1450 displays an enable button 1451 and a disable button 1452 in an active state so as to be selectively pressed. When the enable button 1451 pressed to establish a setting, a job output is started after a test chart is output. When the disable button 1452 is pressed to establish a setting, a job output is disabled after a test chart is output. In the case of a job output, the output can be distributed in response to a user's instruction to start the output or at the completion of correction.

Pressing an OK button 1453 establishes the contents of settings, whereas pressing a cancel button 1454 cancels the contents of settings.

In the case where a job subsequent to a parallel tandem job is a parallel tandem job between the image forming apparatuses where color matching has been conducted, a color adjustment has been already made and thus additional adjustment is not necessary. Thus, the parallel tandem job may be output.

Figure 11:
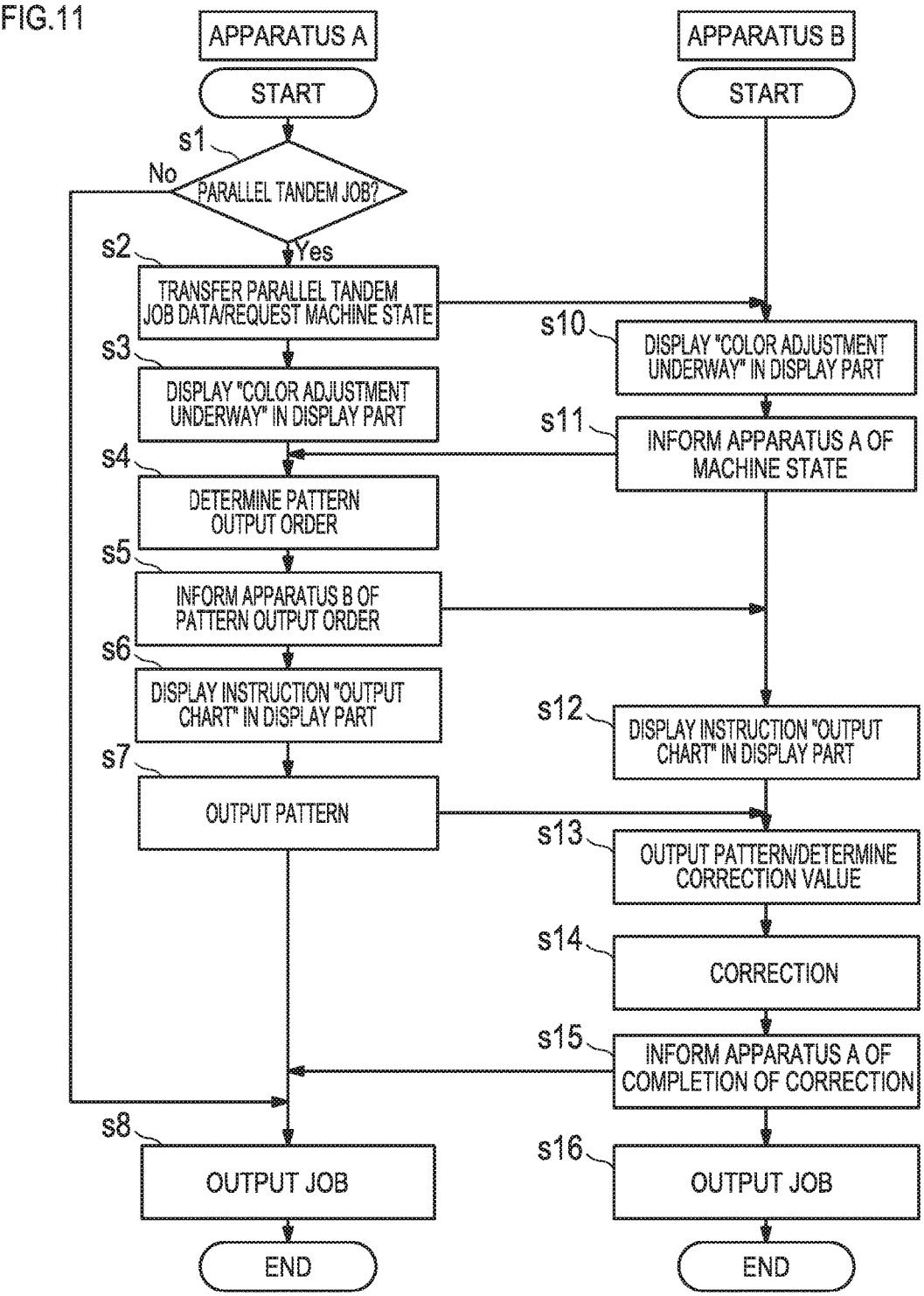
FIG. 11 is a flowchart showing the steps of determining the order of the image forming apparatuses for adjusting image quality, and outputting a job in a distributed manner.

Referring to the flowchart of FIG. 11, the following will discuss the steps of determining, in a distributed output, the order of the image forming apparatuses for adjusting image quality, and outputting a job. The steps are performed under the control of the control sections. A distributed job is controlled by the image forming apparatus A.

The image forming apparatus A is activated in response to reception of a job; meanwhile, the image forming apparatus B is activated into a standby state. The image forming apparatus A decides whether a job is a parallel tandem job or not (step s1). If the job is not a parallel tandem job (step s1, No), the process advances to step s8 to output the job, and then the process is completed. If the job is a parallel tandem job (step s1, Yes), the image forming apparatus A transfers the data of a distributed job to the image forming apparatus that outputs a distributed job, and then the image forming apparatus A requests a machine state from the image forming apparatus having received the transferred data (step s2). The display part displays "Color adjustment underway" (step s3).

The image forming apparatus B receives the data of a distributed job from the image forming apparatus A, displays "Color adjustment underway" in the display part (step s10), and then informs the image forming apparatus A of the machine state of the image forming apparatus B (step s11).

In the image forming apparatus A, the output order of patterns, that is, charts is determined also for the image forming apparatus that outputs an individual test chart, such that the first image forming apparatus outputs a reference test chart, in response to the machine state of the image forming apparatus B (step s4). After that, the image forming apparatus A informs the image forming apparatus B, which performs a distributed job, of the output order of patterns (step s5). In the image forming apparatus B, the display part displays an instruction "Output a chart" (step s12). In the image forming apparatus A, the display part displays an instruction "Output a chart" after the image forming apparatus is informed of the output order of patterns (step s6), and then the image forming apparatus A outputs a pattern (step s7).

In the image forming apparatus B, a pattern is output using transfer paper with a pattern output from the image forming apparatus A. The pattern is read by the reader, and then the reading result is analyzed by the control section to determine a correction value (step s13). After that, a correction is made (step s14).

At the completion of correction, the image forming apparatus B informs the image forming apparatus A of the completion of correction (step s15), outputs a job (step s16), and then completes the processing.

After the output of the pattern, the image forming apparatus A is informed of the completion of correction from the image forming apparatus B, outputs a job (step s8), and then completes the processing. Since the job is output after the output of the pattern, the job can be output regardless of the completion of correction in the image forming apparatus B. The image forming apparatus A may be informed of the completion of correction during the output of a job or after the completion of a job.

Referring to the flowchart of FIG. 12, the following will discuss the steps of determining, in a distributed output, the order of the image forming apparatuses for adjusting image quality, and outputting a job based on the setting of a job output after the output of a pattern. The steps are performed under the control of the control sections. A distributed job is controlled by the image forming apparatus A.

The image forming apparatus A is activated in response to reception of a job; meanwhile, the image forming apparatus B is activated into a standby state. The image forming apparatus A decides whether a job is a parallel tandem job or not (step s20). If the job is not a parallel tandem job (step s20, No), the process advances to step s28 to output the job, and then the process is completed. If the job is a parallel tandem job (step s20, Yes), the image forming apparatus A transfers the data of a distributed job to the image forming apparatus that outputs a distributed job, and then the image forming apparatus A requests a machine state from the image forming apparatus having received the transferred data (step s21). The display part displays "Color adjustment underway" (step s22).

The image forming apparatus B receives the data of a distributed job from the image forming apparatus A, displays "Color adjustment underway" in the display part (step s30), and then informs the image forming apparatus A of the machine state of the image forming apparatus B (step s31).

In the image forming apparatus A, the output order of patterns, that is, charts is determined also for the image forming apparatus that outputs an individual test chart, such that the first image forming apparatus outputs a reference test chart, in response to the machine state of the image forming apparatus B (step s23). After that, the image forming apparatus A informs the image forming apparatus B, which performs a distributed job, of the output order of patterns (step s24). In the image forming apparatus B, the display part displays an instruction "Output a chart" (step s32). In the image forming apparatus A, the display part displays an instruction "Output a chart" after the image forming apparatus is informed of the output order of patterns (step s25), and then the image forming apparatus A outputs a pattern (step s26).

In the image forming apparatus B, a pattern is output using transfer paper with a pattern output from the image forming apparatus A. The pattern is read by the reader, and then the reading result is analyzed by the control section to determine a correction value (step s33). After that, a correction is made (step s34).

At the completion of correction, the image forming apparatus B informs the image forming apparatus A of the completion of correction (step s35), outputs a job (step s36), and then completes the processing.

After the output of the pattern, the image forming apparatus A decides whether a job output has been set after the output of a chart (step s27). In the case where a job output is set after the output of a chart (step s27, Yes), a job is output (step s28), and then the processing is completed. In the case where a job output is not set after the output of a chart (step s27, No), it is decided whether or not the image forming apparatus B has informed the image forming apparatus A of the completion of correction (step s29). The image forming apparatus A waits for the completion of correction (step s29, No). When being informed of the completion of correction (step s29, Yes), the image forming apparatus A outputs a job (step s28) and then completes the processing.

Referring to the flowchart of FIG. 13, the following will discuss the step of outputting a job when a distributed output is continued in the absence of another destination apparatus for distribution. The steps are performed under the control of the control sections. A distributed job is controlled by the image forming apparatus A.

The image forming apparatus A is activated in response to reception of a job; meanwhile, the image forming apparatus B is activated into a standby state. The image forming apparatus A decides whether a job is a parallel tandem job or not (step s40). If the job is not a parallel tandem job (step s40, No), the process advances to step s43 to output the job, and then the process is completed. If the job is a parallel tandem job (step s40, Yes), the presence or absence of another apparatus for the tandem job is decided (step s41). In the presence of another apparatus for the tandem job (step s41, No), the image forming apparatus A transfers the data of a distributed job to the image forming apparatus that outputs a distributed job, and then the image forming apparatus A requests a machine state from the image forming apparatus having received the transferred data (step s44). The display part displays "Color adjustment underway" (step s45).

The image forming apparatus B receives the data of a distributed job from the image forming apparatus A, displays "Color adjustment underway" in the display part (step s50), and then informs the image forming apparatus A of the machine state of the image forming apparatus B (step s51).

In the image forming apparatus A, the output order of patterns, that is, charts is determined also for the image forming apparatus that outputs an individual test chart, such that the first image forming apparatus outputs a reference test chart, in response to the machine state of the image forming apparatus B (step s46). After that, the image forming apparatus A informs the image forming apparatus B, which performs a distributed job, of the output order of patterns (step s47). In the image forming apparatus B, the display part displays an instruction "Output a chart" (step s52). In the image forming apparatus A, the display part displays an instruction "Output a chart" after the image forming apparatus is informed of the output order of patterns (step s48), and then the image forming apparatus A outputs a pattern (step s49).

In the image forming apparatus B, a pattern is output using transfer paper with a pattern output from the image forming apparatus A. The pattern is read by the reader, and then the reading result is analyzed by the control section to determine a correction value (step s53). After that, a correction is made (step s54).

At the completion of correction, the image forming apparatus B informs the image forming apparatus A of the completion of correction (step s55), outputs a job (step s56), and then completes the processing.

After the output of the pattern, the image forming apparatus A is informed of the completion of correction from the image forming apparatus B, outputs a job (step s43), and then completes the processing. Since the job is output after the output of the pattern, the job can be output regardless of the completion of correction in the image forming apparatus B. The image forming apparatus A may be informed of the completion of correction during the output of a job or after the completion of a job.

In step s41, in the absence of another apparatus for the tandem job (step 41, Yes), the parallel tandem job is transferred to the image forming apparatus B (step s42), allowing the image forming apparatus B to output a job (step s56). After step s42, the image forming apparatus A outputs a job (step s43) and then completes the processing. In this configuration, if image quality has been already adjusted in the absence of another apparatus for a tandem job, a distributed job can be performed without adjusting image quality.

The present embodiment has the effect of properly determining, according to the states of the image forming apparatuses, the image forming apparatus that prints a reference test chart for an image quality adjustment when a job is output to the image forming apparatuses in a distributed manner.

The present invention was described according to the foregoing embodiments. The present invention is not limited to the contents of the embodiments and changes can be optionally made without departing from the scope of the invention.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus which is included in an image forming system that comprises a plurality of image forming apparatuses that are connected via a network, and that outputs a job to the plurality of image forming apparatuses in a distributed manner, the image forming apparatus comprising:

a printer; and a hardware processor that is configured to:

receive the job;

determine whether the received job is a parallel tandem job;

in a case in which it is determined that the received job is a parallel tandem job, transfer, via the network, data of the parallel tandem job to distribute the job to at least one other image forming apparatus of the image forming system, and acquire, via the network, state information indicating an operating state of the at least one other image forming apparatus to which the distributed job is transmitted;

determine, based on the acquired state information of the at least one other image forming apparatus and based on state information of the present image forming apparatus, which among the plurality of image forming apparatuses is to print a reference test chart on a transfer medium, and which among the plurality of image forming apparatuses is to print an individual test chart on a transfer medium, wherein the reference test chart is used as a reference for an image formation adjustment in each of the image forming apparatuses, in a case in which it is determined that the present image forming apparatus is to print the reference test chart, control the printer to print the reference test chart on the transfer medium, and transmit an instruction to the at least one other image forming apparatus to print the individual test chart, wherein the at least one other image forming apparatus performs image quality correction based on the reference test chart printed by the printer of the present image forming apparatus and the individual test chart printed by a printer of the at least one other image forming apparatus so as to match image quality of the present image forming apparatus; and in a case in which it is determined that the present image forming apparatus is to print the individual test chart, control the printer of the present image forming apparatus to print the individual test chart, and perform image quality correction based on the printed individual test chart and based on a reference test chart printed by another one of the image forming apparatuses so as to match the image quality of the image forming apparatus which printed the reference test chart, wherein the state information includes at least one of a number of reserved jobs and an installation status of a sensor for reading the reference test chart and the individual test chart.

2. The image forming apparatus according to claim 1, wherein the state information further includes information about machine configurations of the image forming apparatuses.

3. The image forming apparatus according to claim 1, wherein the reference test chart and the individual test chart are identical to each other.

4. The image forming apparatus according to claim 1, wherein the hardware processor is configured to determine a printing order of the plurality of image forming apparatuses that print the reference test chart and the at least one individual test chart, such that one of the present image forming apparatus and the at least one other image forming apparatus that prints the reference test chart performs printing of the reference test chart before the other of the present image forming apparatus and the at least one other image forming apparatus that prints the individual test chart performs printing of the individual test chart.

5. The image forming apparatus according to claim 1, wherein the hardware processor is configured to indicate, on the same transfer medium, a printing region of the reference test chart, and a printing region of the individual test chart to be printed, to the respective one of the present image forming apparatus and the at least one other image forming apparatus that is to print the reference test chart and the one of the present image forming apparatus and the at least one other image forming apparatus that is to print the individual test chart.

6. The image forming apparatus according to claim 1, wherein when a job is output in a distributed manner, the image forming apparatuses perform the image formation adjustment under control of the hardware processor before the job is output.

7. The image forming apparatus according to claim 1, wherein in a case in which the image forming system includes an image forming apparatus among the plurality of image forming apparatuses in which the sensor is installed and an image forming apparatus among the plurality of image forming apparatuses in which the sensor is not installed, the hardware processor determines the image forming apparatus in which the sensor is not installed as an image forming apparatus among the plurality of image forming apparatuses that is to print the reference test chart on the transfer medium.

8. The image forming apparatus according to claim 1, wherein the state information includes the number of reserved jobs for the plurality of image forming apparatuses, and the hardware processor determines the image forming apparatus among the plurality of image forming apparatuses that is to print the reference test chart according to the number of jobs reserved for the image forming apparatuses indicated in the state information.

9. The image forming apparatus according to claim 8, wherein the hardware processor determines, according to the number of reserved jobs, a printing order of the one of the present image forming apparatus and the at least one other image forming apparatus that is to print the reference test chart and the other of the present image forming apparatus and the at least one other image forming apparatus that is to print the individual test chart.

10. The image forming apparatus according to claim 1, wherein the hardware processor is configured to determine a printing order for the image forming apparatus among the plurality of image forming apparatuses that is to print the reference test chart and the at least one other image forming apparatus that is to print the individual test chart according to previous results of image formation adjustment of the plurality of image forming apparatuses, such that the reference test chart is first printed in the image forming apparatus where image formation is relatively stable.

11. The image forming apparatus according to claim 1, wherein the hardware processor is configured to disable additional image formation adjustment when a job is output in a distributed manner.

12. The image forming apparatus according to claim 1, wherein the hardware processor is configured to control the one of the present image forming apparatus and the at least one other image forming apparatus that printed the reference test chart, such that a distributed output of a job is started before completion of image formation adjustment in the other of the present image forming apparatus and the at least one other image forming apparatus.

13. The image forming apparatus according to claim 1, wherein in the case where a job subsequent to a current distributed output job is a distributed output job, when the image forming apparatuses to receive subsequently output jobs do not include an image forming apparatus with unadjusted image formation from among the plurality of image forming apparatuses, the hardware processor performs the distributed output job of the subsequent job without adjusting image formation of the subsequent job.

14. An image forming system comprising a plurality of image forming apparatuses that are connected via a network, the image forming system outputting a job to the plurality of the image forming apparatuses in a distributed manner, each of the plurality of the image forming apparatuses including a printer, the system comprising:

a hardware processor that is configured to:

receive the job;

determine whether the received job is a parallel tandem job;

in a case in which it is determined that the received job is a parallel tandem job, transfer, via the network, data of the parallel tandem job to distribute the job to the plurality of image forming apparatuses, and acquire, via the network, state information indicating an operating state of the plurality of image forming apparatuses to which the distributed job is transmitted;

determine based on the acquired state information of the plurality of image forming apparatuses, which among the plurality of image forming apparatuses is to print a reference test chart on a transfer medium, and which among the plurality of image forming apparatuses is to print an individual test chart on a transfer medium, wherein the test chart is used as a reference for an image formation adjustment in each of the image forming apparatuses;

control the printer of a first image forming apparatus among the plurality of image forming apparatuses which is determined as the image forming apparatus to print the reference test chart, to print the reference test chart on the transfer medium;

control the printer of at least one other image forming apparatus among the plurality of image forming apparatuses which is determined as the image forming apparatus to print the individual test chart, to print the individual test chart; and control the at least one other image forming apparatus to perform image quality correction based on the reference test chart printed by the printer of the first image forming apparatus and the individual test chart printed by the printer of the at least one other image forming apparatus so as to match image quality of the first image forming apparatus, wherein the state information includes at least one of a number of reserved jobs and an installation status of a sensor for reading the reference test chart and the individual test chart.

15. The image forming system according to claim 14, wherein the hardware processor determines a printing order such that the first image forming apparatus prints the reference test chart before the at least one other image forming apparatus prints the individual test chart.

16. A management apparatus managing a system comprising a plurality of image forming apparatuses that are connected via a network, the system outputting a job to the plurality of the image forming apparatuses in a distributed manner, each of the plurality of image forming apparatuses including a printer, the management apparatus comprising:
a hardware processor that is configured to:
receive the job;
determine whether the received job is a parallel tandem job;
in a case in which it is determined that the received job is a parallel tandem job, transfer, via the network, data of the parallel tandem job to distribute the job to the plurality of image forming apparatuses, and acquire, via the network, state information indicating an operating state of the plurality of image forming apparatuses to which the distributed job is transmitted;
determine based on the acquired state information of the plurality of image forming apparatuses, which among the plurality of image forming apparatuses is to print a reference test chart on a transfer medium, and which among the plurality of image forming apparatuses is to print an individual test chart on a transfer medium, wherein the test chart being used as a reference for an image quality adjustment in each of the image forming apparatuses;

control the printer of a first image forming apparatus among the plurality of image forming apparatuses which is determined as the image forming apparatus to print the reference test chart, to print the reference test chart on the transfer medium;

control the printer of at least one other image forming apparatus among the plurality of image forming apparatuses which is determined as the image forming apparatus to print the individual test chart, to print the individual test chart; and control the at least one other image forming apparatus to perform image quality correction based on the reference test chart printed by the printer of the first image forming apparatus and the individual test chart printed by the printer of the at least one other image forming apparatus so as to match image quality of the first image forming apparatus, wherein the state information includes at least one of a number of reserved jobs and an installation status of a sensor for reading the reference test chart and the individual test chart.

17. The management apparatus according to claim 16, wherein the hardware processor determines a printing order such that the first image forming apparatus prints the reference test chart before the at least one other image forming apparatus prints the individual test chart.

18. A non-transitory computer-readable recording medium that stores a program executed in a computer for controlling a distributed output of an image forming system including a plurality of image forming apparatuses, the image forming system outputting a job to the plurality of the image forming apparatuses in a distributed manner, each of the plurality of image forming apparatuses including a printer, the program causing the computer to perform functions comprising:
receiving the job;
determining whether the received job is a parallel tandem job;
in a case in which it is determined that the received job is a parallel tandem job, transferring, via the network, data of the parallel tandem job to distribute the job to the plurality of image forming apparatuses, and acquiring, via the network, state information indicating an operating state of the plurality of image forming apparatuses to which the distributed job is transmitted;
determining based on the acquired state information of the plurality of image forming apparatuses, which among the plurality of image forming apparatuses is to print a reference test chart on a transfer medium, and which among the plurality of image forming apparatuses is to print an individual test chart on a transfer medium, wherein the reference test chart is used as a reference for an image quality adjustment in each of the image forming apparatuses controlling the printer of a first image forming apparatus among the plurality of image forming apparatuses which is determined as the image forming apparatus to print the reference test chart, to print the reference test chart on the transfer medium;

controlling the printer of at least one other image forming apparatus among the plurality of image forming apparatuses which is determined as the image forming apparatus to print the individual test chart, to print the individual test chart; and controlling the at least one other image forming apparatus to perform image quality correction based on the reference test chart printed by the printer of the first image forming apparatus and the individual test chart printed by the printer of the at least one other image forming apparatus so as to match image quality of the first image forming apparatus, wherein the state information includes at least one of a number of reserved jobs and an installation status of a sensor for reading the reference test chart and the individual test chart.

19. The non-transitory computer-readable recording medium that stores a program according to claim 18, wherein the program determines a printing order such that the first image forming apparatus prints the reference test chart, before the at least one other image forming apparatus prints the individual test chart, and the program causes the computer to instruct the image forming apparatuses to print the respective reference test chart and individual test chart according to the printing order.

\* \* \* \* \*